(12) United States Patent
Badr et al.

(10) Patent No.: US 7,689,588 B2
(45) Date of Patent: Mar. 30, 2010

(54) METHOD OF SYNTACTIC PATTERN RECOGNITION OF SEQUENCES

(75) Inventors: Ghada Badr, Ottawa (CA); John B. Oommen, North Gower (CA)

(73) Assignee: 3618633 Canada Inc. (CA)

( * ) Notice: Subject to any disclaimer, the term of this patent is extended or adjusted under 35 U.S.C. 154(b) by 204 days.

(21) Appl. No.: 11/916,605

(22) PCT Filed: Apr. 4, 2006

(86) PCT No.: PCT/CA2006/000493

§ 371 (c)(1),
(2), (4) Date: Mar. 4, 2008

(87) PCT Pub. No.: WO2006/130947

PCT Pub. Date: Dec. 14, 2006

(65) Prior Publication Data

US 2008/0208854 A1    Aug. 28, 2008

(30) Foreign Application Priority Data

Jun. 6, 2005    (CA)    .................................. 2,509,496

(51) Int. Cl.
*G06F 17/00* (2006.01)
(52) U.S. Cl. .................... 707/103 R; 707/100; 707/101; 707/102
(58) Field of Classification Search ............. 707/103 R, 707/100–102
See application file for complete search history.

(56) References Cited

U.S. PATENT DOCUMENTS

| 6,377,945 | B1 | 4/2002 | Risvik | |
| 6,496,843 | B1 * | 12/2002 | Getchius et al. ............. | 715/210 |
| 6,745,384 | B1 * | 6/2004 | Biggerstaff ................. | 717/156 |
| 7,370,061 | B2 * | 5/2008 | Chakraborty et al. ....... | 707/102 |
| 2006/0167928 | A1 * | 7/2006 | Chakraborty et al. ....... | 707/102 |

OTHER PUBLICATIONS

PCT, International Preliminary Report on Patentability, International Application No. PCT/CA2006/00493 (6 pages) (Dec. 6, 2007).
Shang, H. et al., "Tries for Approximate String Matching," *IEEE Transactions on Knowledge and Data Engineering*, vol. 4, No. 4, pp. 540-547 (Aug. 1996).
Chen, C.-H., "Lexicon-Driven Word Recognition," *Proceedings of the Third International Conference on Document Analysis and Recognition*, pp. 919-922 (Aug. 14-Aug. 16, 1995).

(Continued)

*Primary Examiner*—Sana Al-Hashemi
(74) *Attorney, Agent, or Firm*—Thompson Hine LLP

(57) ABSTRACT

This invention relates to the Pattern Recognition (PR) of noisy/inexact strings and sequences and particularly to syntactic Pattern Recognition. The present invention presents a process by which a user can recognize an unknown sting X, which is an element of a finite, but possibly larger Dictionary, H, by processing the information contained in its noisy/inexact version, Y, where Y is assumed to contain substitution, insertion or deletion errors. The recognized string, which is the best estimate X+ of X, is defined as that element of H which minimizes the Generalized Levenshtein Distance D(X, Y) between X and Y, for all X<H. Rather than evaluate D(X5Y) for every X<H sequentially, the present invention achieves this simultaneously for every X<H by representing the Dictionary as a Trie, and searching the Trie using a new AI-based search strategy.

14 Claims, 10 Drawing Sheets

OTHER PUBLICATIONS

Chen, D.Y. et al., "An Efficient Algorithm for Matching a Lexicon with a Segmentation Graph," *Proceedings of the Fifth International Conference on Document Analysis and Recognition*, pp. 543-546 (Sep. 20-Sep. 23, 1999).

Oommen, B.J. et al., "String Taxonomy Using Learning Automata," *IEEE Transactions of Systems, Main, and Cybernetics—Part B: Cybernetics*, vol. 27, No. 2, pp. 354-365 (Apr. 1997).

Acharya, A. et al., "Adaptive Algorithms for Cache-efficient Trie Search," *ACM and SIAM Workshop on Algorithm Engineering and Experimentation* (11 pages) (Jan. 1999).

Baeza-Yates, R. et al., "Fast Approximate String Matching in a Dictionary," *Proceedings of the 5th South American Symposium on String Processing and Information Retrieval (SPIRE '98)*, IEEE CS Press (9 pages) (1998).

Bentley, J.L. et al., "Fast Algorithms for Sorting and Searching Strings," *Eighth Annual ACM-SIAM Symposium on Discrete Algorithms*, New Orleans, Louisiana (10 pages) (Jan. 1997).

Bunke, H., "Fast Approximate Matching of Words Against a Dictionary," *Computing*, 55, pp. 75-89 (1995).

Clement, J. et al., "The Analysis of Hybrid Trie Structures," *Proceedings of the Ninth ACM-SIAM Symposium on Discrete Algorithms (SODA)*, San Francisco, California (13 pages) (1998).

Dewey, G., *Relativ Frequency of English Speech Sounds*, Cambridge Harvard University Press, pp. 17-30 (1923).

Du, M.-W. et al., "An Approach to Designing Very Fast Approximate String Matching Algorithms," *IEEE Transactions on Knowledge and Data Engineering*, vol. 6, No. 4, pp. 620-633 (Aug. 1994).

Forney, Jr., G.D., "The Viterbi Algorithm," *Proceedings of the IEEE*, vol. 61, No. 3, pp. 268-278 (Mar. 1973).

Kashyap, R.L. et al., "An Effective Algorithm for String Correction Using Generalized Edit Distances—I. Description of the Algorithm and Its Optimality," *Information Sciences*, 23, pp. 123-142 (1981).

Luger, G.F. et al., *Artificial Intelligence. Structures and Strategies for Complex Problem Solving, Third Edition*, Addison Wesley Longman, Inc., pp. 123-144 (1998).

Oflazer, K., "Error-tolerant Finite-state Recognition with Applications to Morphological Analysis and Spelling Correction," *Computational Linguistics*, vol. 22, No. 1, pp. 73-89 (Mar. 1996).

Oommen, B.J. et al., "Dictionary-Based Syntactic Pattern Recognition Using Tries," *Proceedings of the Joint IARR International Workshops SSPR 2004 and SPR 2004*, pp. 251-259 (Aug. 2004).

Oommen, B.J. et al., "A Formal Theory For Optimal And Information Theoretic Syntactic Pattern Recognition," *Pattern Recognition*, vol. 31, No. 8, pp. 1159-1177 (1998).

Pearl, J., *Heuristics. Intelligent Search Strategies for Computer Problem Solving*, Addison-Wesley Publishing Company, pp. 3-32 (1984).

Peterson, J.L., "Computer Programs for Detecting and Correcting Spelling Errors," *Communications of the ACM*, vol. 23, No. 12, pp. 676-687 (Dec. 1980).

Russell, S.J. et al., *Artificial Intelligence. A Modern Approach, Second Edition*, Pearson Education, Inc., pp. 115-116 (2003).

Ukkonen, E., "Algorithms for Approximate String Matching," *Information and Control*, 64, pp. 110-118 (1985).

Wagner, R.A. et al., "The String-to-String Correction Problem," *Journal of the Association for Computing Machinery*, vol. 21, No. 1, pp. 168-173 (Jan. 1974).

International Search Report issued regarding International Application No. PCT/CA2006/000493 (Jul. 16, 2006).

\* cited by examiner

|   | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 867 | 1 | 1 | 1 | 1 | 1 | 1 | 1 | 1 | 1 | 1 | 1 | 1 | 1 | 1 | 1 | 14 | 1 | 20 | 1 | 1 | 1 | 10 | 5 | 1 | 14 |
| b | 1 | 861 | 1 | 1 | 1 | 1 | 14 | 14 | 1 | 1 | 1 | 1 | 1 | 20 | 1 | 1 | 1 | 1 | 1 | 1 | 1 | 20 | 1 | 1 | 1 | 1 |
| c | 1 | 1 | 861 | 14 | 1 | 14 | 1 | 1 | 1 | 1 | 1 | 1 | 1 | 1 | 1 | 1 | 1 | 1 | 1 | 1 | 1 | 20 | 1 | 20 | 1 | 1 |
| d | 1 | 1 | 14 | 835 | 14 | 20 | 1 | 1 | 1 | 1 | 1 | 1 | 1 | 1 | 1 | 1 | 1 | 1 | 10 | 20 | 1 | 1 | 1 | 5 | 14 | 1 | 1 |
| e | 1 | 1 | 1 | 14 | 857 | 5 | 1 | 1 | 1 | 1 | 1 | 1 | 1 | 1 | 1 | 1 | 1 | 1 | 20 | 14 | 1 | 1 | 1 | 20 | 1 | 1 | 1 |
| f | 1 | 1 | 14 | 20 | 10 | 824 | 20 | 1 | 1 | 1 | 1 | 1 | 1 | 1 | 1 | 1 | 1 | 1 | 20 | 1 | 10 | 1 | 14 | 1 | 1 | 1 | 1 |
| g | 1 | 14 | 1 | 1 | 1 | 20 | 835 | 20 | 1 | 1 | 1 | 1 | 1 | 1 | 1 | 1 | 1 | 1 | 5 | 1 | 14 | 1 | 14 | 1 | 1 | 10 | 1 |
| h | 1 | 14 | 1 | 1 | 1 | 1 | 20 | 835 | 1 | 20 | 1 | 1 | 1 | 14 | 1 | 1 | 1 | 1 | 1 | 1 | 5 | 10 | 1 | 1 | 1 | 14 | 1 |
| i | 1 | 1 | 1 | 1 | 1 | 1 | 1 | 1 | 861 | 10 | 14 | 5 | 1 | 1 | 20 | 1 | 1 | 1 | 1 | 1 | 20 | 1 | 1 | 1 | 1 | 1 |
| j | 1 | 1 | 1 | 1 | 1 | 1 | 1 | 20 | 10 | 835 | 20 | 1 | 14 | 14 | 1 | 1 | 1 | 1 | 1 | 1 | 14 | 1 | 1 | 1 | 5 | 1 |
| k | 1 | 1 | 1 | 1 | 1 | 1 | 1 | 1 | 14 | 20 | 848 | 20 | 14 | 1 | 10 | 1 | 1 | 1 | 1 | 1 | 5 | 1 | 1 | 1 | 1 | 1 |
| l | 1 | 1 | 1 | 1 | 1 | 1 | 1 | 1 | 5 | 1 | 20 | 876 | 1 | 1 | 14 | 14 | 1 | 1 | 1 | 1 | 1 | 1 | 1 | 1 | 1 | 1 |
| m | 1 | 1 | 1 | 1 | 1 | 1 | 1 | 5 | 1 | 14 | 14 | 1 | 876 | 20 | 1 | 1 | 1 | 1 | 1 | 1 | 1 | 1 | 1 | 1 | 1 | 1 |
| n | 1 | 20 | 1 | 1 | 1 | 1 | 5 | 14 | 1 | 14 | 1 | 1 | 20 | 857 | 1 | 1 | 1 | 1 | 1 | 1 | 1 | 1 | 1 | 1 | 1 | 1 |
| o | 1 | 1 | 1 | 1 | 1 | 1 | 1 | 1 | 20 | 1 | 14 | 14 | 1 | 1 | 861 | 20 | 1 | 1 | 1 | 1 | 1 | 1 | 1 | 1 | 1 | 1 |
| p | 1 | 1 | 1 | 1 | 1 | 1 | 1 | 1 | 1 | 1 | 1 | 14 | 1 | 1 | 20 | 893 | 1 | 1 | 1 | 1 | 1 | 1 | 1 | 1 | 1 | 1 |
| q | 14 | 1 | 1 | 1 | 1 | 1 | 1 | 1 | 1 | 1 | 1 | 1 | 1 | 1 | 1 | 1 | 892 | 1 | 5 | 1 | 1 | 1 | 17 | 1 | 1 | 1 |
| r | 1 | 1 | 1 | 14 | 17 | 14 | 5 | 1 | 1 | 1 | 1 | 1 | 1 | 1 | 1 | 1 | 1 | 863 | 1 | 17 | 1 | 1 | 1 | 1 | 1 | 1 |
| s | 17 | 1 | 1 | 17 | 10 | 1 | 1 | 1 | 1 | 1 | 1 | 1 | 1 | 1 | 1 | 1 | 5 | 1 | 841 | 1 | 1 | 1 | 14 | 14 | 1 | 14 |
| t | 1 | 1 | 1 | 1 | 1 | 14 | 14 | 10 | 1 | 1 | 1 | 1 | 1 | 1 | 1 | 1 | 1 | 17 | 1 | 858 | 1 | 1 | 1 | 1 | 17 | 1 |
| u | 1 | 1 | 1 | 1 | 1 | 1 | 1 | 14 | 17 | 14 | 10 | 1 | 1 | 1 | 1 | 1 | 1 | 1 | 1 | 1 | 858 | 1 | 1 | 1 | 17 | 1 |
| v | 1 | 17 | 17 | 5 | 1 | 14 | 14 | 1 | 1 | 1 | 1 | 1 | 1 | 1 | 1 | 1 | 1 | 1 | 1 | 1 | 1 | 863 | 1 | 1 | 1 | 1 |
| w | 10 | 1 | 1 | 5 | 17 | 1 | 1 | 1 | 1 | 1 | 1 | 1 | 1 | 1 | 1 | 1 | 17 | 1 | 14 | 1 | 1 | 1 | 857 | 1 | 1 | 1 |
| x | 5 | 1 | 17 | 14 | 1 | 1 | 1 | 1 | 1 | 1 | 1 | 1 | 1 | 1 | 1 | 1 | 1 | 1 | 14 | 1 | 1 | 1 | 1 | 863 | 1 | 17 |
| y | 1 | 1 | 1 | 1 | 1 | 1 | 14 | 14 | 1 | 5 | 1 | 1 | 1 | 1 | 1 | 1 | 1 | 1 | 1 | 17 | 17 | 1 | 1 | 1 | 863 | 1 |
| z | 14 | 1 | 1 | 1 | 1 | 1 | 1 | 1 | 1 | 1 | 1 | 1 | 1 | 1 | 1 | 1 | 1 | 1 | 14 | 1 | 1 | 1 | 1 | 17 | 1 | 883 |

Figure 10

METHOD OF SYNTACTIC PATTERN RECOGNITION OF SEQUENCES

FIELD OF THE INVENTION

The present invention relates to the Pattern Recognition of noisy or inexact strings and sequences and particularly to syntactic Pattern Recognition of noisy or inexact strings and sequences.

BACKGROUND OF THE INVENTION

Searching through large alpha and numeric data structures involving nodes such as in the Internet, or large directories or data bases of data (each of which are referred to herein as a "Dictionary") requires significant computing power due to the large number of possible locations in which potentially relevant information is stored. Additionally, the possibility that the search string or data has been mistyped or recorded erroneously presents additional difficulties, particularly when considering large data sets such as those involving the Internet, or large directories or data bases of data.

Previous pattern recognition techniques using symbol-based errors have used the Levenshtein metric as the basis of comparison. The inter-symbol distances can be of a 0/1 sort, parametric or entirely symbol dependent, in which case, they are usually assigned in terms of the confusion probabilities. The metric which uses symbol-dependent distances is referred to herein as the Generalized Levenshtein Distance (GLD). A previously known method of correction of garbled words based on the Levenshtein metric, proposed an efficient algorithm for computing this distance by utilizing the concepts of dynamic programming.

Dictionary-based Approaches

Most of the time-efficient methods currently available, require that the maximum number of errors be known a priori, and these schemes are optimized for the case when the edit distance costs are of a 0/1 form. For examples, Du et. al. (An approach to designing very fast approximate string matching algorithms, *IEEE Transactions on Knowledge and Data Engineering*, 6(4):620-633, (1994)) proposed an approach to design a very fast algorithm for approximate string matching which divided the dictionary into partitions according to the lengths of the words. They limited their discussion to cases where the error distance between the given string and its nearest neighbors in the dictionary was "small".

Bunke (Fast approximate matching of words against a dictionary. *Computing*, 55(1):75-89, (1995)) proposed the construction of a finite state automaton for computing the edit distance for every string in the dictionary. These automata are combined into one "global" automaton that represents the dictionary, which, in turn, is used to calculate the nearest neighbor for the noisy string when compared against the active dictionary. This algorithm requires time which is linear in the length of the noisy string. However, the number of states of the automaton grows exponentially. Unfortunately, the algorithm needs excessive space, rendering it impractical. For example, for the English alphabet with 26 characters, the minimum number of possible states needed is 29,619! for processing a single string in the dictionary.

Oflazer (Error-tolerant finite state recognition with applications to morphological analysis and spelling correction, *Computational Linguistics*, 22(1):73-89, (1996)) also considered another method that could easily deal with very large lexicons. The set of all dictionary words is treated as a regular language over the alphabet of letters. By providing a deterministic finite state automaton recognizing this language, Oflazer suggested that a variant of the Wagner-Fisher algorithm can be designed to control the traversal through the automaton in such a way that only those prefixes which could potentially lead to a correct candidate $X^+$ (where $GLD(X^+, Y) < K$) be generated. To achieve this, he used the notion of a cut-off edit distance, which measures the minimum edit distance between an initial substring of the incorrect input string, and the (possibly partial) candidate correct string. The cutoff-edit distance required the a priori knowledge of the maximum number of errors found in Y and that the inter symbol distances are of 0/1 sort, or a maximum error value when general distances are used.

Baeza-Yates et. al (Fast approximate string matching in a dictionary. *in Proceedings of the 5th South American Symposium on String Processing and Information Retrieval (SPIRE'98), IEEE CS Press*, pages 14-22, (1998)) proposed two speed-up techniques for on-line approximate searching in large indexed textual databases when the search is done on the vocabulary of the text. The first proposal requires approximately 10% extra space and exploited the fact that consecutive strings in a stored dictionary tend to share a prefix. The second proposal required even more additional space. The proposal here was to organize the vocabulary in such a way as to avoid the complete on-line traversal. The organization, in turn, was based on the fact that they sought only those elements of H which are at an edit distance of at most K units from the given query string. Clearly, the efficiency of this method depends on the number of errors allowed.

The literature also reports some methods that have proposed a filtering step so as to decrease the number of words in the dictionary, and that need to be considered for calculations.

Dictionaries Represented as Tries

For the purpose of this document, a "Trie" is a data structure that can be used to store a dictionary when the latter is represented as a set of words or strings, the data being represented in the nodes in which the alphabet/symbols of the word/string is stored and there being branches between nodes such that the words/strings of the dictionary are located on paths within the Trie and all words/strings sharing a prefix will be represented by paths branching from a common initial path. FIG. 1 shows an example of a Trie for a simple dictionary of words {for, form, fort, forget, format, formula, fortran, forward}.

In terms of notation, A is a finite alphabet, H is a finite (but possibly large) dictionary, and μ is the null string, distinct from λ, the null symbol. The left derivative of order one of any string $Z = z_1 z_2 \ldots z_k$ is the string $Z_{p=z_1} z_2 \ldots z_{k-1}$. The left derivative of order two of Z is the left derivative of order one of $Z_p$, and so on.

FIG. 1 illustrates the main advantage of the trie as it only maintains the minimal prefix set of characters that is necessary to distinguish all the elements of H.

The trie has the following features:
1. The nodes of the trie correspond to the set of all the prefixes of H.
2. If X is a node in the trie, then $X_p$, the left derivative of order one, will be the parent node of X, and $X_g$, the left derivative of order two, will be the grandparent of X.
3. The root of the trie will be the node corresponding to μ, the null string.
4. The leaves of the trie will all be words in H, although the converse is not true.

With respect to the nodes of the Trie, a node is called a "Terminal" node if it represents the end of a word from the dictionary, even if that node is not the leaf node. Clearly, leaf nodes are necessarily also Terminal nodes.

With regard to traversal, the trie can be considered as a graph, which can be searched using any of the possible search strategies applicable to AI problems. The literature includes two possible strategies that have been applied to tries, namely the Breadth First Search strategy (see Kashyap et. al. (An effective algorithm for string correction using generalized edit distances -i. description of the algorithm and its optimality, *Inf. Sci.*, 23(2):123-142, (1981)), and Oommen et. al. (Dictionary-based syntactic pattern recognition using tries, *Proceedings of the Joint IARR International Workshops SSPR 2004 and SPR* 2004, pages 251-259, (2004))) and the Depth First Search strategy (see Shang et. al. (Tries for approximate string matching, *IEEE Transactions on Knowledge and Data Engineering*, 8(4):540-547, (1996))).

One of the first attempts to avoid repetitive computations for a finite dictionary, was the one which took advantage of prefix information, as proposed by Kashyap et. al. (An effective algorithm for string correction using generalized edit distances -i. description of the algorithm and its optimality, *Inf. Sci.*, 23(2):123-142, (1981)). They proposed a new intermediate edit distance called the "pseudo-distance", from which the final Generalized Levenshtein Distance can be calculated by using only a single additional computation. However, the algorithm in (Kashyap et. al. (An effective algorithm for string correction using generalized edit distances -i. description of the algorithm and its optimality, *Inf. Sci.*, 23(2):123-142, (1981))) was computationally expensive, because it required set-based operations in its entire execution. An efficient Breadth First Search strategy has been recently proposed by Oommen et. al. (Dictionary-based syntactic pattern recognition using tries, *Proceedings of the Joint IARR International Workshops SSPR 2004 and SPR* 2004, pages 251-259, (2004)), which demonstrated how the search can be executed by doing a feasible implementation for the concepts introduced by Kashyap et. al. (An effective algorithm for string correction using generalized edit distances -i. description of the algorithm and its optimality, *Inf. Sci.*, 23(2): 123-142, (1981)). This was achieved by the introduction of a new data structure called the Linked Lists of Prefixes (LLP), which can be constructed when the dictionary is represented by a trie. The LLP permits the level-by-level traversal of the trie, and permits the Breadth First Search calculations using the pseudo-distance and the dynamic equations presented by Kashyap et. al. (An effective algorithm for string correction using generalized edit distances -i. description of the algorithm and its optimality, *Inf. Sci.*, 23(2):123-142, (1981)). An extra memory location was needed at each node to store pseudo-distances calculated so far, and which were needed for further calculations.

Shang et. al. (Tries for approximate string matching, *IEEE Transactions on Knowledge and Data Engineering*, 8(4):540-547, (1996)) used the trie data structure for both exact and approximate string searching. First of all, they presented a trie-based method whose cost was independent of the document size. They then proposed a k-approximate match algorithm on a text represented as a trie, which performed a DFS on the trie using the matrix involved in the dynamic programming equations used in the GLD computation (see Wagner et. al. (The string-to-string correction problem, *Journal of the Association for Computing Machinery (ACM)*, 21:168-173, (1974))). Besides the trie, they also needed to maintain a matrix to represent the Dynamic Programming (DP) matrix required to store the results of the calculations. The trie representation compresses the common prefixes into overlapping paths, and the corresponding column (in the DP matrix) needs to be evaluated only once. The authors (see Shang et. al. (Tries for approximate string matching, *IEEE Transactions on Knowledge and Data Engineering*, 8(4):540-547, (1996))) further applied an existing cutoff strategy, referred to as Ukkonen's cutoff (see Ukkonen (Algorithm for approximate string matching. Information and control, 64:100-118, (1985))), to optimize column calculations for the DP matrix and also to abort unsuccessful searches. However, in order to apply these cutoff principles, the user has to know the maximum number of errors, K, a priori, and also resort to use 0/1 costs for the inter-symbol edit distances, which is not a requirement in the present invention.

Heuristic Search

AI problem solvers employ heuristics in two basic situations (see Luger et. al. (*Artificial Intelligence Structure and Strategies for Complex Problem Solving*, Addison-Wesley, (1998)), and. Pearl (*Heuristics: intelligent search strategies for computer problem solving*, Addison-Wesley, (1984))):

A problem may not have an exact solution because of inherent ambiguities in the problem statement or available data. In this case heuristics are used to choose the most likely solution.

A problem may have an exact solution, but the computational cost of determining it may be prohibitive. Heuristics attack this complexity by guiding the search along the most "promising" path through the space. By eliminating unpromising states and their descendants from further consideration, a heuristic algorithm can defeat this combinatorial explosion, and find an acceptable solution.

A heuristic is only an informed guess of the next step to be taken in solving a problem (see Luger et. al. (*Artificial Intelligence Structure and Strategies for Complex Problem Solving*, Addison-Wesley, (1998)), and Pearl (*Heuristics: intelligent search strategies for computer problem solving*, Addison-Wesley, (1984))), which is often based on experience or intuition. Because heuristics use limited information, they can seldom be able to predict the exact behavior of the state space farther along the search. A heuristic can lead a search algorithm to a suboptimal solution, or fail to find any solution at all. This is an inherent limitation of a heuristic search.

Heuristics and the design of algorithms to implement heuristic search have long been a core concern of AI research. Game playing and theorem proving are two of the oldest applications in AI; both of these require heuristics to prune spaces of possible solutions. It is not feasible to examine every inference that can be made in a domain of mathematics, or to investigate every possible move that can be made on a chessboard, and thus a heuristic search is often the only practical answer. It is useful to think of heuristic algorithms as consisting of two parts: the heuristic measure and an algorithm that uses it to search the state space.

In the context of this document, whenever we refer to heuristic search, we imply those methods that are used for solving the problems possessing ambiguities or which are inherently extremely time consuming. In both these cases, the invention utilizes a heuristic that efficiently prunes the space and leads to a solution.

Beam Search (BS)

One method to implement a heuristic search is through a Hill-Climbing (HC) procedure (see Luger et. al. (*Artificial Intelligence Structure and Strategies for Complex Problem Solving*, Addison-Wesley, (1998)), and Pearl (*Heuristics:* intelligent search strategies for computer problem solving, Addison-Wesley, (1984))). HC strategies expand the current state in the search space and evaluate its children. The best child is selected for further expansion, and neither its siblings nor its parent are retained. The search halts when it reaches a state that is better than any of its children.

Because it keeps no history, the algorithm cannot recover from failures. A major problem of HC strategies is their tendency to become "stuck" at local maxima/minima. In spite of its limitations, HC can be used effectively if the evaluation function is sufficiently informative so as to avoid local optima. Also, the HC strategies have a high ability of pruning the search space, even if the problem is ambiguous.

Heuristic search can also use more informed schemes (see Luger et. al. (*Artificial Intelligence Structure and Strategies for Complex Problem Solving*, Addison-Wesley, (1998)), and Pearl (*Heuristics: intelligent search strategies for computer problem solving*, Addison-Wesley, (1984))), provided by the so-called Best-First Search (BFS). The BFS, like the Breadth-First search and DFS algorithms, uses a list to maintain the states of the space. At each iteration, the BFS considers the most "promising" state. This is acceptable when an exact match is considered, as it will reach the goal much faster, and it will also stop as soon as the goal is attained. But if the problem is ambiguous, the algorithm may have to search the entire space to find the nearest goal, or to yield the best candidates that can approximate the goal.

To overcome the problems of HC, and to provide more pruning than the BFS, researchers have proposed other heuristics such as the Beam Search[1] (BS) (see Russell et. al. (*Artificial Intelligence: A Modern Approach*, Prentice Hall, (2003))). In BS, the process retains q states, rather than a single state as in HC, and these are stored in a single pool. The process then evaluates them using the objective function. At each iteration, all the successors of all the q states are generated, and if one is the goal, the process is terminated stop. Otherwise, the process selects the best q successors from the complete list and repeat the process. This BS avoids the combinatorial explosion problem of the Breadth-First search by expanding only the q most promising nodes at each level, where a heuristic is used to predict which nodes are likely to be closest to the goal, and to pick the best q successors.

[1] In the context of this invention, whenever we refer to a Beam Search, we are referring to a local beam search, which is a combination of an AI-based local search and the traditional beam search (see Russell et. al. (*Artificial Intelligence: A Modern Approach*, Prentice Hall, (2003))) methodologies.

One potential problem of the BS is that the q states chosen tend to quickly lack diversity. The major advantage of the BS, however, is that it increases both the space and time efficiency dramatically, and the literature includes many applications in which the BS pruning heuristic has been used. These applications include: Handwriting recognition, Optical Character Recognition (OCR), word recognition, speech recognition, information retrieval, and error-correcting Viterbi parsing.

SUMMARY OF THE INVENTION

It is an object of the present invention to provide a method for an improved searching methodology of large Dictionaries, databases, directories or the Internet. It is a further object of the present invention to provide a method which overcomes problems in the prior art by reducing the number of steps or calculations required to locate relevant or searched-for data. It is a further object of the present invention to provide a method for locating data where the query contains noise, or the data is inaccurately represented.

In one aspect the present invention relates to a method executed in a computer system for comparing the similarity of a target string to each of the strings in a Dictionary of strings, the said target string and each of the strings in the Dictionary being a sequence of symbols taken from an alphabet of symbols, the Dictionary storing the strings in a Trie, where the root of the Trie represents the Null string, the internal nodes of the Trie represent the prefixes of the strings in the said Dictionary, and where the parent of any node represents a string which is the prefix whose length is less by unity than the length of the string representing the said node comprising the steps of utilizing at least one inter-symbol edit distance between the symbols of the said alphabet specifying a condition when a node in the trie is a goal node traversing the said Trie by (i) maintaining at least one list of nodes in a data structure containing the nodes to be processed; (ii) evaluating a heuristic function for at least one node from at least one list from the said at least one list of nodes in the data structure; (iii) ranking at least one node from the nodes for which the said heuristic function was evaluated; (iv) replacing at least one node from the said list of nodes by its descendants in the Trie into the said data structure; (v) deleting, if necessary, nodes from at least one list from the said lists of nodes but retaining at least one node; repeating steps (ii)-(v) until a node which satisfies the said condition has been attained.

In another aspect this invention specifies a method executed in a computer system for comparing the similarity of a target string to each of the strings in a Dictionary of strings, the said target string and each of the strings in the Dictionary being a sequence of symbols taken from an alphabet of symbols, comprising the steps of creating the the representation of the Dictionary as a Trie where the root of the Trie represents the Null string, the internal nodes of the Trie represent the prefixes of the strings in the said Dictionary, and where the parent of any node represents a string which is the prefix whose length is less by unity than the length of the string representing the said node, utilizing at least one inter-symbol edit distance between the symbols of the said alphabet, specifying a condition when a node in the trie is a goal node, traversing the said Trie by (i) maintaining at least one list of nodes in a data structure containing the nodes to be processed; (ii) evaluating a heuristic function for at least one node from at least one list from the said at least one list of nodes in the data structure; (iii) ranking at least one node from the nodes for which the said heuristic function was evaluated; (iv) replacing at least one node from the said list of nodes by its descendants in the Trie into the said data structure; (v) deleting, if necessary, nodes from at least one list from the said lists of nodes but retaining at least one node; and (vi) repeating steps (ii)-(v) until a node which satisfies the said condition has been attained.

The advantage of the present invention is that it provides a fast, efficient, and highly accurate method for locating data from a large dictionary, database, directory, or the Internet.

BRIEF DESCRIPTION OF THE DRAWINGS

A preferred embodiment of the present invention is described below with reference to the accompanying drawings in which:

FIG. 10 presents a "confusion matrix" based on the proximity of character keys on the standard QWERTY keyboard. Each entry is the probability of substituting one character of the English alphabet with another. The figures in the table are to be multiplied by a factor of $10^{-3}$.

DETAILED DESCRIPTION OF THE INVENTION

Figure 1:
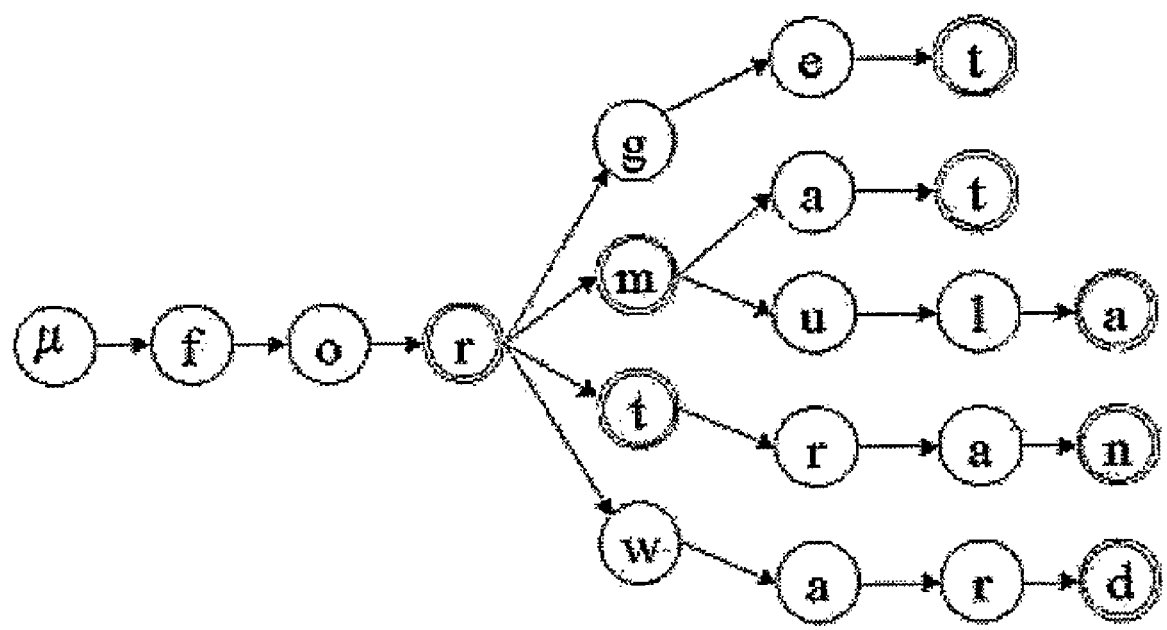
FIG. 1 shows an example of a dictionary stored as a trie with the words {for, form, fort, fortran, formula, format, forward, forget}.

The present invention presents a process by which the user can recognize an unknown string $X^*$ which is an element of a finite, but possibly large Dictionary, H, by processing the information contained in its noisy/inexact version, Y, where Y is assumed to contain substitution, insertion and deletion errors. The recognized string, which is the best estimate $X^+$ of $X^*$, is defined as that element of H which minimizes the Generalized Levenshtein Distance D(X, Y) between X and Y, for all $X \in H$[2]. Rather than evaluate D(X, Y) for every $X \in H$ sequentially, the present invention achieves this simultaneously for every $X \in H$, and this is achieved by representing the Dictionary as a trie, and searching the trie using a new AI-based search strategy referred to herein as the Clustered Beam Search.

[2] Observe that if Y is an element of H, the problem reduces to an exact string matching problem, in which case $X^*$ will be recognized as Y. To render the problem non-trivial, we assume that this invention is used whenever Y is not an element of H.

The trie is a data structure that offers search costs that are independent of the document size. Tries also combine prefixes together, and so, by using tries in approximate string matching, the invention utilizes the information obtained in the process of evaluating any one $D(X_i, Y)$, to compute any other $D(X_j, Y)$, where $X_i$ and $X_j$ share a common prefix.

The present invention includes a novel technique that enhances the Beam Search (BS), which shall be referred to herein as the Clustered Beam Search (CBS), and which can be applied to any tree searching problem. The method of the present invention then applies the new scheme to the approximate string matching field when the dictionary is stored as a trie. The trie is implemented as a Linked List of Prefixes (LLP). The LLP consists of a linked list of levels, where each level is a level in the corresponding trie. Each level, in turn, consists of a linked list of all prefixes that have the same length. The levels are ordered in an increasing order of the length of the prefixes, exactly as in the case of the trie levels. The character written in each node is actually a pointer to the node of the trie itself, and so we can access the parent nodes in the trie in a straightforward manner (see FIG. 2). The LLP permits level-by-level traversal of the trie (as opposed to traversal along the "branches"). The method of the present invention can be used for Generalized Levenshtein distances, and also when the maximum number of errors is not given a priori. When compared with the Depth-First Search, the method of the present invention yields a significant improvement (of up to 75%) with respect to the number of operations needed, and at the same time maintains almost the same accuracy. The CBS heuristic of the present invention is also compared with the performance of the original BS heuristic when applied to the trie structure, and the experiments again show a significant improvement. Furthermore, by marginally sacrificing a small accuracy for the general error model, or by permitting an error model that increases the errors as the length of the word increases (as explained hereafter), even further improvement in the number of operations can be obtained.

In one embodiment of the present invention a new heuristic search strategy which incorporates clusters is utilized to yield an enhanced scheme for the BS. The search is done level-by-level for the tree structure[3], where the term "level" means those nodes at the same depth from the root of the trie. At each level, clusters of nodes are considered, where, in this preferred embodiment of the invention, nodes being clustered have the property that if they belong to the same cluster, they all represent prefixes which have the same last symbol. For example, in this embodiment, all nodes at one level having the character 'u' form a cluster distinct from the cluster of nodes having the character 'v'. In this embodiment, the technique of the present invention maintains |A| small priority queues, where A is the set of possible clusters that can be followed while moving from one node to its children[4]. The lists maintain only the best first q nodes corresponding to each cluster, and in this way the search space is pruned to have only q|A| nodes in each level.

[3] For the case where the graph is a general structure (and not a tree), the search process has to maintain the traditional Open and Close lists that are used for the Best First Search (see Luger et. al. (*Artificial Intelligence Structure and Strategies for Complex Problem Solving*, Addison-Wesley, (1998)), and Pearl (*Heuristics: intelligent search strategies for computer problem solving*, Addison-Wesley, (1984))).

[4] For example, A can be the set of letters in the alphabet in the case of the trie.

In a preferred embodiment of the invention, the list of prefixes represented by the nodes in each cluster are maintained in a sorted order using a priority queue. The priority queue can, in turn, be implemented using either a matrix/array formulation or with the use of pointers, both of which are techniques well-known to a person skilled in the art.

The CBS considers some nodes in the search, and discards the others from further calculations. But unlike the BS, it does not compare all the nodes in same level in a single priority queue, but compares only the nodes in the same cluster. The advantage of such a strategy is that the load of maintaining the priority queue is divided into |A| priority queues. In this way, the number of computations needed for sorting will dramatically decrease for the same number of nodes taken from each level.

As q increases, the accuracy increases and the pruning ability decreases. When the evaluation function is informative, a small value for q can be used. As q increases, the cost associated with maintaining the order of the lists may overcome the advantage of pruning, but the possibility of including a larger number of nodes per level increases with the new CBS scheme when compared to the BS. This leads to the increase in accuracy.

In an alternate embodiment of the invention, the number of elements retained in each cluster need not be a fixed number, q. Rather, in this alternate embodiment, only those nodes whose prefixes have a heuristic measurement (from the target string) less than a threshold are retained in the cluster for computations encountered in the next level of the trie.

The pseudo code for this preferred embodiment of the process is shown in Process 1 set out below, and is given pictorially in FIG. 8. The saving of the CBS over the BS appears in step 8, in which the process only maintains a small queue.

Schematic of CBS

Figure 8:
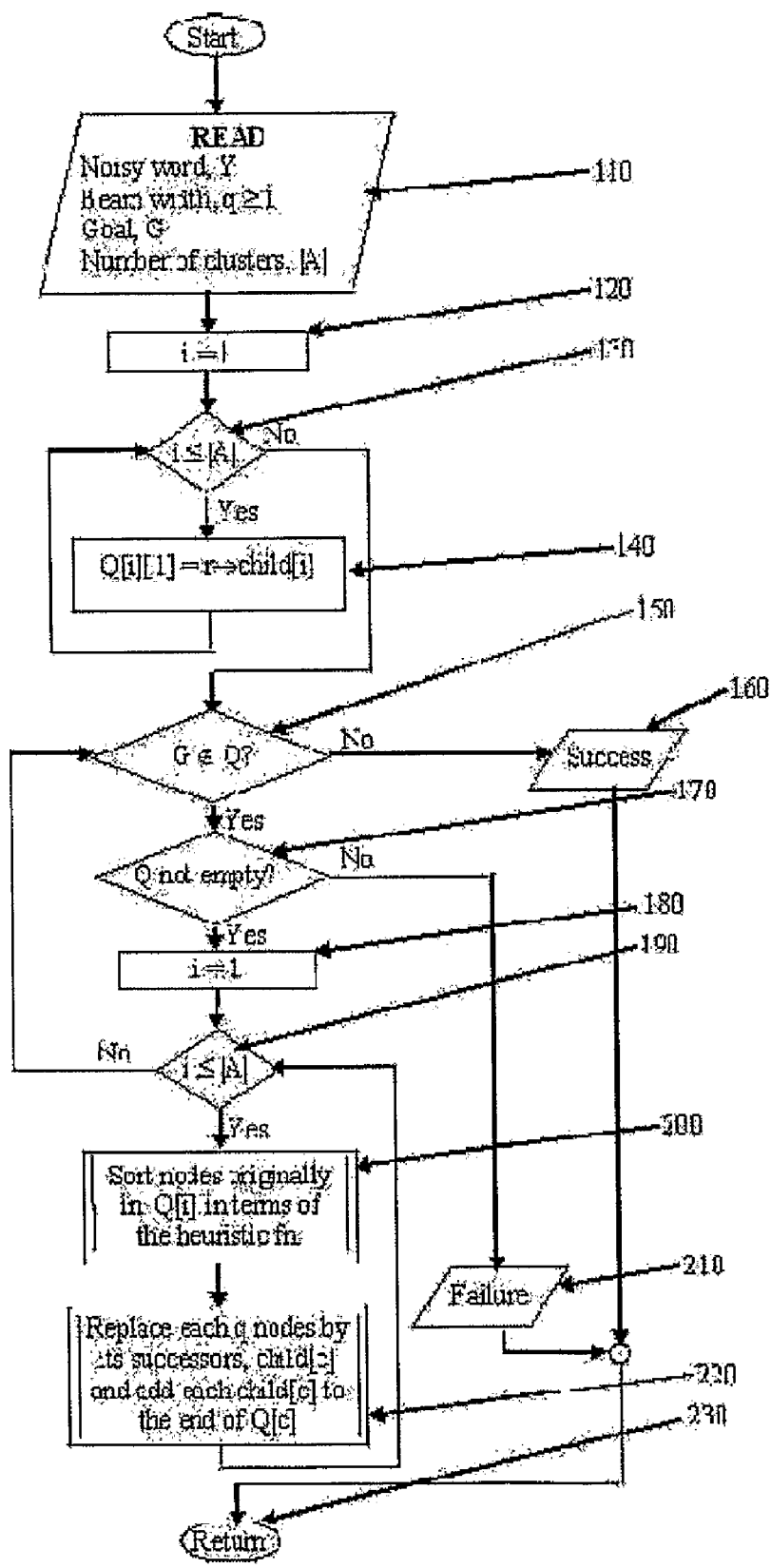
FIG. 8 presents a schematic diagram showing the Process CBS. The inputs to the process are the noisy string, Y, the beam width, q, the goal, G, and the number of clusters, A. The output is success or failure. The graph to be processed is assumed to be of a tree structure.

The Process CBS, depicted in FIG. 8, begins in block 110, in which the input noisy word, Y, the beam width, q, the goal, G, and the number of clusters, |A|, are read. The trie that the invention is working on may be considered be a tree structure of root r. In block 120, a counter, i, is set to 1. The next decision block (block 130) constitutes the starting point of an iteration on the |A| queues stored in Q and that are used to maintain the best q nodes in each cluster. When there are still more queues (the branch "Yes"), the process continues with block 140, where the current queue, Q[i], is assigned a single node, which is the child i of the root node, r. The root node has a maximum of one child in each cluster. When all the queues have been initialized (the branch "No" of the decision block 130), the process continues with the decision block 150, which tests if the goal is found in Q or not. The branch "No" of block 150 continues with another decision block 170 which checks if Q is empty or not, which indicates whether the tree is totally pruned or if there are still more branches to be investigated, respectively. When Q is not empty (the branch "yes" of the decision block 170), the process continues with the block 180, in which the counter i is initialized to 1. The process continues with the decision block 190 which constitutes a starting point of an iteration on the number of clusters, |A|. When there are more clusters to be processed (the branch "Yes"), the process continues with the process block 200, in which the all the nodes in the queue Q[i] are replaced by their children, and where each child that corresponds to cluster c is added to queue Q[c]. These children are not considered for processing in the next block (process block 220). The next block is the process block 220, in which the original nodes in Q[i], (namely those which do not consider the children nodes added to the end of the queue Q[i]), are sorted according to the heuristic function used, and in which only the best first q nodes are retained.

The branch "No" of the decision block 150 indicates that the goal, g, has been found and the process continues with the Input/Output block 160, where the process returns "success". The branch "No" of the decision block 170 continues with the Input/Output block 220, where the process returns "failure". The branch "No" of the decision block 190 indicates that the processing for the queues, Q, for the current tree level terminates and return to the decision block 150. The process terminates in block 230.

---
Process 1 CBS
---
Input:
   a.   The tree to be searched, T, with clusters, A.
   b.   The matrix Q[|A| × q] to maintain the priority queues.
   c.   The beam width, q, considered for each cluster.
   d.   The goal searched for.
Output: Success or Failure.
Method:
  1:  Form |A| single-element queues, Q[1,...,|A|], where each queue Q[i] contains the child in cluster i of the root node.
  2:  while Q is not empty and the goal is not found do
  3:     Determine if any of the elements in Q is the goal.
  4:     if goal found then
  5:        return Success.
  6:     else
  7:        for each Q[i], where $1 \leq i \leq |A|$ do
  8:           Sort the nodes originally in Q[i] in terms of the heuristic, keeping only the first best q nodes.
  9:           Replace each of the q nodes by its successors, and add each successor to the end of the corresponding Q[c] according to its cluster c.
10:        end for
11:     end if
12:  end while
13:  return Failure.
14:  End Process CBS

---

If the number of nodes after pruning in any level is $O(q|A|)$, the number of children considered for pruning in the next level is $O(q|A|^2)$, which is then divided among the |A| clusters. For each cluster, the invention maintains a priority queue containing q nodes. Then the search cost will be $O(ch(q|A|^2)\log(q))$, where c is the cost of calculating the heuristic function per node, and h is the maximum height of the tree which is the maximum number of levels. If the |A| queues can be maintained in parallel, then the cost will be reduced to $O(ch(q|A|)\log(q))$. This is in contrast to the BS where the search cost will be $O(ch(q|A|^2)\log(q|A|))$, because the corresponding BS keeps only one queue of length $O(q|A|)$. The benefits of the CBS increases as |A| increases, while the performance of the BS will decrease.

The CBS for Approximate String Matching

For approximate string matching the problem encountered involves both ambiguities, and the associated excessive search time required as the dictionary is large. A heuristic is sought to help determine the nearest neighbor to the noisy string, and one which can also be used to prune the space.

The present invention describes a heuristic search for the approximate string matching problem to also prune the search space when the inter-symbol distances are general, and when the maximum number of errors cannot be known a priori. To fully describe the present invention, we first present the heuristic measure, and the data structures used to facilitate the calculations, and then finally, present the process as it is applicable to approximate string matching.

The Heuristic measure

In string-processing applications, the traditional distance metrics quantify D(X, Y) as the minimum cost of transforming one string, X, into the other. Y. This distance is intricately related to the costs associated with the individual edit operations, the substitution, insertion, and deletion or "SID" operations. These inter-symbol distances can be of a 0/1 sort, parametric or entirely symbol dependent. If they are symbol dependent, they are usually assigned in terms of the confusion probabilities as:

$$d(x, y) = -\ln[Pr(x \to y) \div Pr(x \to x)] \quad (1)$$

$$d(x, \lambda) = -\ln[Pr(x \text{ is deleted}) \div Pr(x \to x)]$$

$$d(\lambda, x) = K \cdot d(x, \lambda),$$

where K is an empirically determined constant.

Two possible heuristic functions that are used by specific embodiments of the present invention are discussed below. Both of those heuristic functions can also be used as a measure to prune the search space. These measures are:

Heuristic function $F_1$: The Edit distance $D(X, Y)$ $F_1$ can be computed using the dynamic programming rule:

$$D(x_1 x_2 \ldots x_N, y_1 y_2 \ldots y_M) = \quad (2)$$

$$\min[\{D(x_1 x_2 \ldots x_{N-1}, y_1 y_2 \ldots y_{M-1}) + d(x_N, y_M)\},$$

$$\{D(x_1 x_2 \ldots x_N, y_1 y_2 \ldots y_{M-1}) + d(\lambda, y_M)\},$$

$$\{D(x_1 x_2 \ldots x_{N-1}, y_1 y_2 \ldots y_M) + d(x_N, \lambda)\}],$$

where $X = X_1 X_2 \ldots X_N$ and $Y = y x_1 y_2 \ldots Y_M$.

Recognition using distance criteria is obtained by essentially evaluating the string in the dictionary which is "closest" to the noisy one as per the metric under consideration.

These dynamic equations are exactly the ones that are used for the DFS-Trie-Based technique (see Shang et. al. (Tries for approximate string matching, *IEEE Transactions on Knowledge and Data Engineering*, 8(4):540-547, (1996))), where the actual inter-symbol costs are of a 0/1 sort, and when the transposition evaluation is added to the dynamic equation. Both the trie and the matrix are needed in the calculations. When the DFS is used in the calculations, one will observe that only a single column will have to be calculated at any given time, and this only depends on the previously calculated column, which is already stored in the matrix, thus preserving the previous calculations.

Heuristic function $F_2$: The Pseudo-distance $D_1(X, Y)$

The second heuristic function, $F_2$, turns out to be the pseudo-distance proposed by Kashyap et. al. (An effective algorithm for string correction using generalized edit distances -i. description of the algorithm and its optimality, *Inf. Sci.*, 23(2):123-142, (1981)). For each character in Y, the pseudo-distance is calculated for the whole trie (level-by-level), where for each character of Y that is processed, the invention considers two additional levels of the trie.

Data Structures Used

There are two main data structures used to facilitate the computations, which are:

The Linked List of Prefixes (LLP): To calculate the best estimate $X^+$, one embodiment of the present invention divides the dictionary into its sets of prefixes. Each set $H^{(p)}$ is the set of all the prefixes of H, of length which equals p, where $1 \leq p \leq N_m$, and where $N_m$ is the length of longest word in H. More precisely, the preferred embodiment of the invention processes the trie level-by-level. The trie in itself, divides the prefixes and the dictionary in a desirable way, and further represents the underlying finite state machine in an elegant manner. But the problem in the trie structure is that it can be implemented in different ways, and it is not easily traversed level-by-level. So what is required is a data structure that facilitates the trie traversal, and that also leads to a unique representation which can always be used to effectively compute the edit distances or pseudo-distances for the prefixes. This data structure shall be referred to herein as the Linked Lists of Prefixes (LLP).

Figure 2:
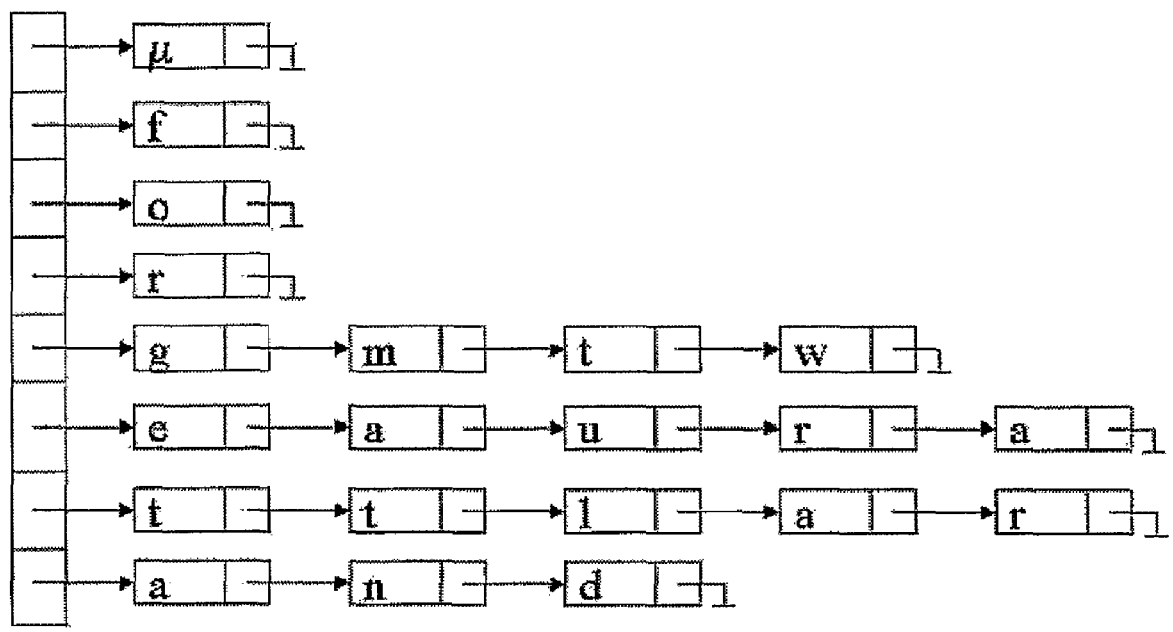
FIG. 2 presents the corresponding Linked List of Prefixes (LLP) for the trie of FIG. 1 with words {for, form, fort, fortran, formula, format, forward, forget}.

The LLP can be built from the trie, by implementing it as an ensemble of linked lists, and where all the lists at the same level are "coalesced together to make one list. Simultaneously, the LLP also permits one to keep the same parent and children information. The LLP consists of a linked list of levels, where each level is a level in the corresponding trie. Each level, in turn, consists of a linked list of all prefixes that have the same length p. The levels are ordered in an increasing order of the length of the prefixes, exactly as in the case of the trie levels. FIG. 2 shows the corresponding LLP for the trie of FIG. 1. The links for children and parent are omitted in the figure for simplification.

Within each entry of the LLP, a link is maintained to the column information that is needed for the calculations required for the next children. In this way, the method of the present invention only needs to maintain this column information for a certain number of nodes of each level, where this number is specified by the quantity childq. This column link is NULL if the node is already pruned. The storage requirement for the LLP is the same as the trie, in addition to the links between children in the same level, and between the different levels themselves and the links to the column information.

The Queues Matrix (QM): This matrix structure is used during the pruning that is done for each level in the LLP. A newly initialized QM matrix is needed for each level. The matrix, QM (of dimension $|A| \times q$), can be used to maintain the $|A|$ priority queues and keep pointers to the best q nodes in each cluster. Each entry in the matrix keeps a pointer to a node in the LLP, and all the pointers in the matrix will be to nodes in the same level. The space required for this matrix is thus $O(q|A|)$.

The two data structures are used simultaneously, in a conjunctive manner, to achieve the pruning that is needed. This will be illustrated hereinafter in more detail.

Applying the CBS

The pseudo code, as shown in Process 2, illustrates how the Process CBS can be applied to approximate string matching, namely the CBS-LLP-Based scheme. It also shows how the proposed data structures, presented in the previous section, can be used to facilitate the calculations. The LLP helps to maintain the list of the best nodes, and to achieve the pruning expediently. Moving the nodes in the same lists will not affect the trie order at all, but helps to effectively maintain information about which nodes are to be processed and which are to be discarded. The QM also helps one to maintain the queues and to retain the required column information. The Process CBS-LLP-Based is given pictorially in FIG. 9.

Schematic of the CBS-LLP-Based

Figure 9:
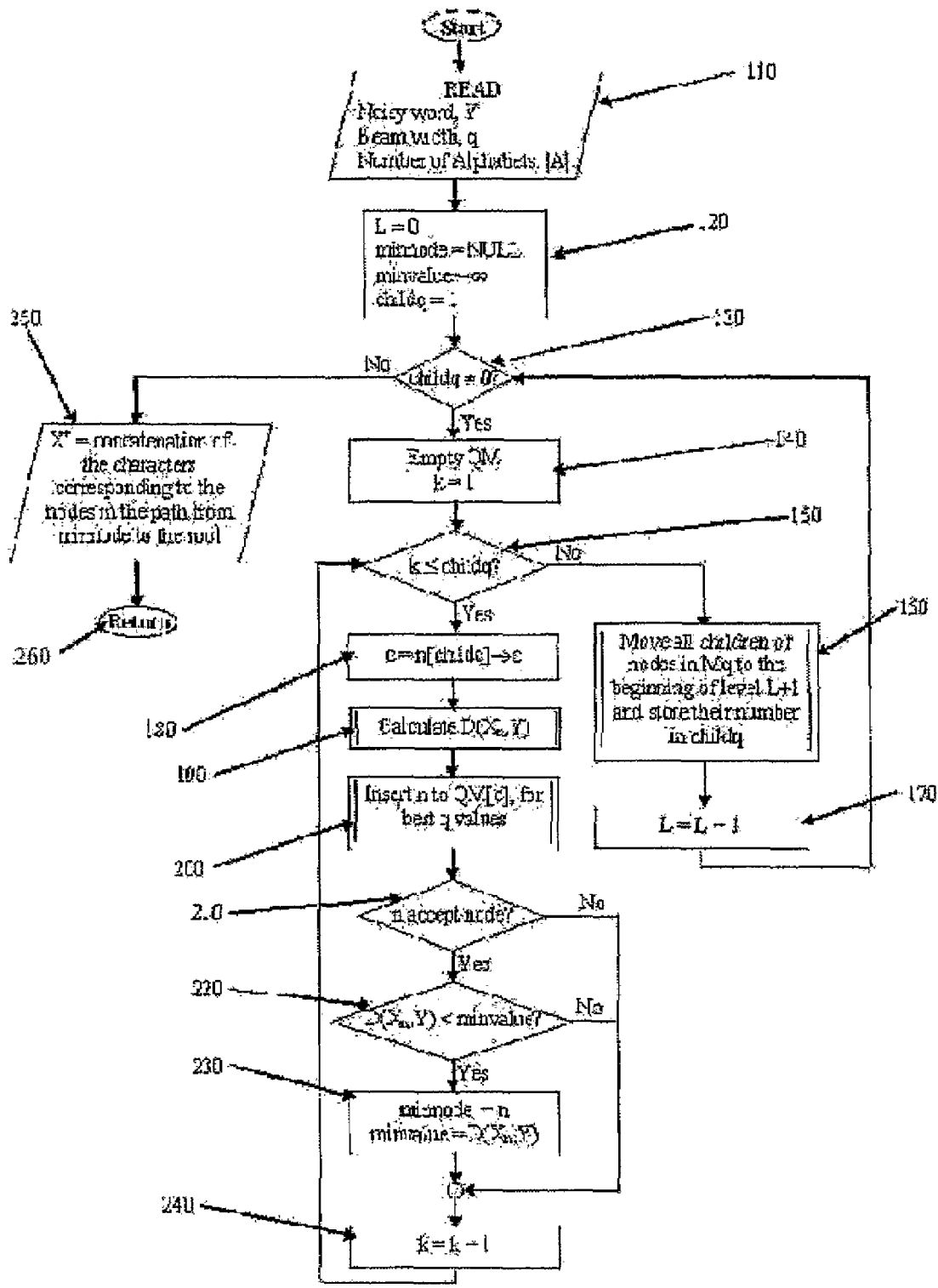
FIG. 9 presents a schematic diagram showing the Process CBS-LLP when applied to approximated string matching. The inputs to the process are the noisy string, Y, the beam width, q, and the number of Alphabet, A. The output is the nearest neighbor, $X^+$. The dictionary is assumed to be stored in the LLP structure presented in FIG. 2.

The process CBS-LLP-Based, depicted in FIG. 9, begins in block 110, in which the input noisy word, Y, the beam width, q, and the number of Alphabet, $|A|$, are read. The dictionary is assumed to be stored in the LLP structure. The process continues with block 120 in which the number of the current level, L, is initialized to 0 (root of the tree), the node, minnode, corresponds to the nearest neighbor string found so far is initialized to NULL, the corresponding minimum value for the edit distance (the heuristic function used), minvalue, found so far, is set to infinity, and finally, the number of nodes, childq, to be processed in the current level is assumed to be one which is the root of the tree. The next block is the decision block 130 which constitutes the starting point of an iteration concerning whether there are nodes in the current level or not. When there is at least one node be processed (the branch "Yes"), the process continues with block 140, where the structure QM is initialized to empty, and the counter K is set to one. The process continues with the decision block 150 which constitutes the starting point of another iteration on the number of nodes to be processed in the current level. The branch "Yes" of the decision block 150 indicates that there are still more nodes (branches) to be processed in the current level, and the process continues with block 180 where the character which corresponds to the current node, n, is stored in c. The process continues with the process block 190 where the edit distance is calculated between the prefix represented by the current nodes and the noisy string Y using the column information stored in the parent of node n. The next block is the process block 200, where the node n is inserted in the corresponding QM[c] if it is one of the best first q nodes. If the distance value of the node n is equal to that of one of the q nodes, one embodiment of the invention permits one to extend the QM[c] to also include n. The process continues with the decision block 210 to test if node n corresponds to an accept node in the LLP, which means that the prefix corresponds to this node is actually a string in the dictionary. The branch "Yes" of the decision block 220 which checks if the edit distance calculated for the prefix corresponds to node n is smaller than the minvalue calculated so far. The branch "Yes" of the decision block 220 leads to the block 230 where the node n is stored in minnode and the corresponding minimum edit distance is stored in minvalue.

The branch "No" of the decision block 210, the decision block 220, and the block 230 lead to the block 240, where the counter k is incremented indicates the end of processing for the nodes n, The process continues again from the decision block 150 to process the next available nodes in the current level if any. The branch "No" of the decision block 150 leads to the process block 160 where all the children of the nodes stored in QM, if any, are moved to the beginning of the next level and the number of all children moved is stored in childq. The process continues with block 170 in which the counter L is incremented indicating the end of computation for the current level. The process continues again with the decision block 130 to check if there are any nodes to be processed in the new current level. When there are no more nodes (branches) to be processed (branch "No" of the decision block 250) the process continues with the Input/Output block 250 where the nearest neighbor string, $X^+$, is output by concatenating all the characters corresponding to the path from the root to the node stored in minnode. The process terminates in block 360.

Experimental Results

To investigate the power of our new method with respect to computation various experiments on three benchmark dictionaries have been conducted. The results obtained with respect to the reduction in the number of computations (the number of addition and minimization operations needed) needed to get the best estimate $X^+$ were significant, and clearly demonstrate the power of the invention. The CBS-LLP-Based scheme was compared with the acclaimed DFS-Trie-Based work for approximate matching (see Shang et. al. (Tries for approximate string matching, *IEEE Transactions on Knowledge and Data Engineering*, 8(4):540-547, (1996))) when the maximum number of errors was not known a priori.

Three benchmark data sets were used in our experiments. Each data set was divided into two parts: a dictionary and the corresponding noisy file. The dictionary was the words or sequences that had to be stored in the Trie. The noisy files consisted of the strings which were searched for in the corresponding dictionary. The three dictionaries which were used were:

Eng: This dictionary consisted of 946 words obtained as a subset of the most common English words (see Dewey (*Relative Frequency of English Speech Sounds*, Harvard Univ. Press, (1923))) augmented with words used in computer literature. The average length of a word was approximately 8.3 characters.

---

Process 2 CBS-LLP-Based Scheme

Input:
  a.  The dictionary, H, represented as a Linked Lists of Prefixes, LLP, with alphabet, A.
  b.  The matrix QM to maintain the priority queues.
  c.  The width of the beam considered for each alphabet q.
  d.  The noisy word, Y, for which we need to determine the nearest neighbor.
Output: $X^+$, the nearest neighbor string in H to Y.
Method:
  1: Start from the first level in LLP, which contains the root of the trie.
  2: Initialize minnode to null, which stores the node representing the string that is nearest neighbor to Y so far.
  3: Initialize childq to 1, which is the number of nodes to be considered in the current level.
  4: while childq ≠ 0 do
  5:     Initialize QM to be empty.
  6:     for for each node n in the childq nodes of the current level do
  7:         Get the character c represented by node n.
  8:         Calculate the edit distances D(X, Y), for the string represented by node n and using the column information stored in the parent of n.
  9:         Add n to QM[c] if it is one of the best q nodes already in the list according to the distance value. If the distance value of the node n is equal to that of one of the q nodes, one embodiment of the invention permits one to extend the QM[c] to also include n.
 10:         if n is an accept node, i.e., a word in the dictionary then -continued Process 2 CBS-LLP-Based Scheme 11:  Compare D(X, Y) with the minimum found so far and if it has lower edit distance value, store n in minnode.
12:  end if
13:  end for
14:  Move all the children of the best nodes in QM to the beginning of the next level in LLP, if any, and store their number in childq.
15:  Increment current level to the next level.
16: end while
17: return the string X⁺, corresponding to the path from minnode to the root.
18: End Process CBS-LLP-Based Scheme

TABLE 1

Statistics of the data sets used in the experiments.

|  | Eng | Dict | Webster |
|---|---|---|---|
| Size of dictionary | 8 KB | 225 KB | 944 KB |
| number of words in dictionary | 964 | 24,539 | 90,141 |
| min word length | 4 | 4 | 4 |
| max word length | 15 | 22 | 21 |

Dict: This is a dictionary file of 24,539 words used in the experiments done by Bentley et. al. (Fast algorithms for sorting and searching strings, *Eighth Annual ACM-SIAM Symposium on Discrete Algorithms New Orleans*, (1997)).

Webster's Unabridged Dictionary: This dictionary of 90,141 words was used by Clement et. al. Clement (The analysis of hybrid trie structures, *Proc. Annual A CM-SIAM Symp. on Discrete Algorithms*, San Francisco, Calif., pages 531-539, (1998)). (see also Acharya et. al. (Adaptive algorithms for cache-efficient trie search. *ACM and SIAM Workshop on Algorithm Engineering and Experimentation*, (1999))) to study the performance of different trie implementations.

The statistics of these data sets are shown in Table 1. The alphabet is assumed to be the 26 lower case letters of the English letters. For all dictionaries we removed words of length smaller than or equal to 4.

Three sets of corresponding noisy files were created for three specific error characteristics, where the latter means the number of errors per word. The three error values tested were for 1, 2, and 3, referred to by the three sets SA, SB, and SC respectively.

Each of the three sets, SA, SB, and SC were generated using the noise generator model described by Oommen et. al. (A formal theory for optimal and information theoretic syntactic pattern recognition, 31:1159-1177, (1998)). The number of insertions generated was geometrically distributed with parameter $\beta=0.7$. The conditional probability of inserting any character $a \in A$ given that an insertion occurred was assigned the value $1/26$; and the probability of deletion was set to be $1/20$. The table of probabilities for substitution (typically called the confusion matrix) was based on the proximity of character keys on the standard QWERTY keyboard and is shown in FIG. 10.

Figure 3:
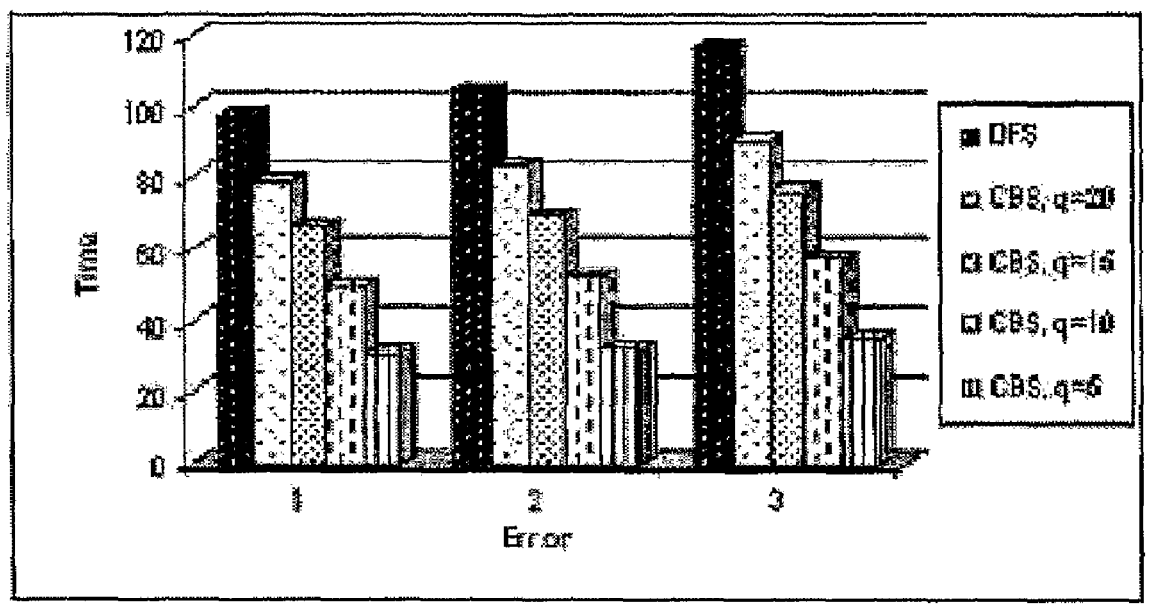
FIG. 3 presents the results for comparing the CBS-LLP-Based method with the DFS-Trie-Based method for the Eng dictionary. The time is represented by the total number of operations in millions.
Figure 3:
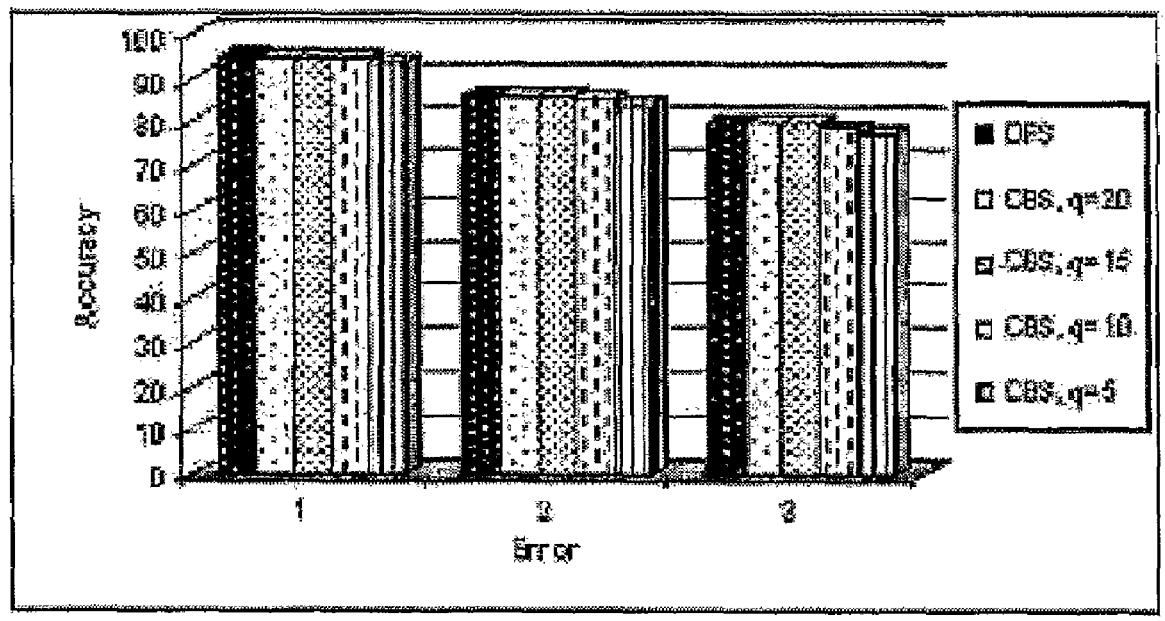
Figure 4:
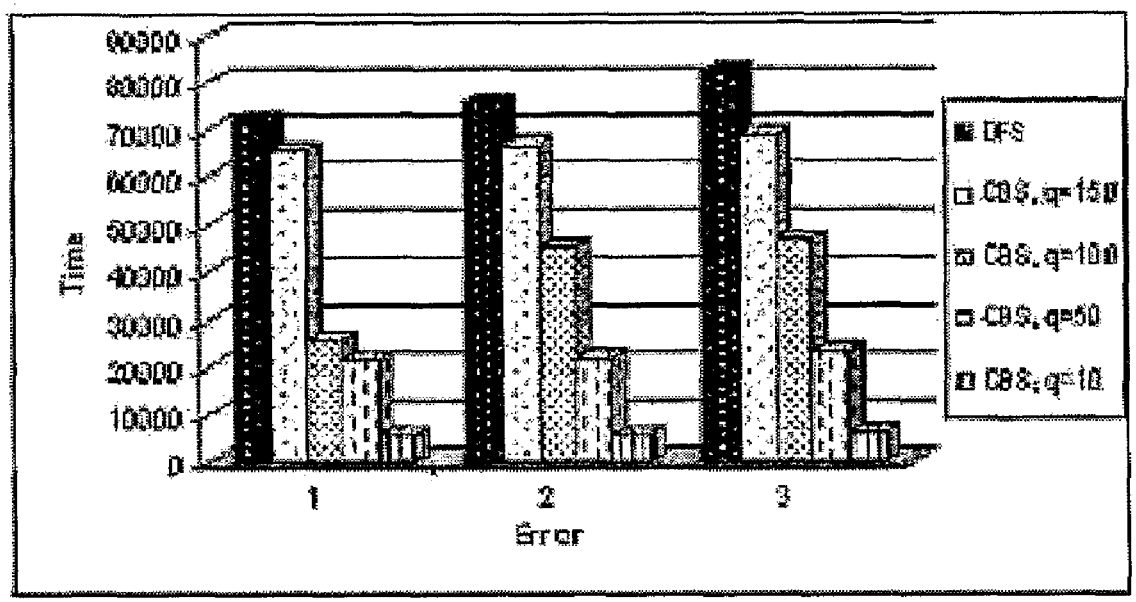
FIG. 4 presents the results for comparing the CBS-LLP-Based method with the DFS-Trie-Based method for the Dict dictionary. The time is represented by the total number of operations in millions.
Figure 4:
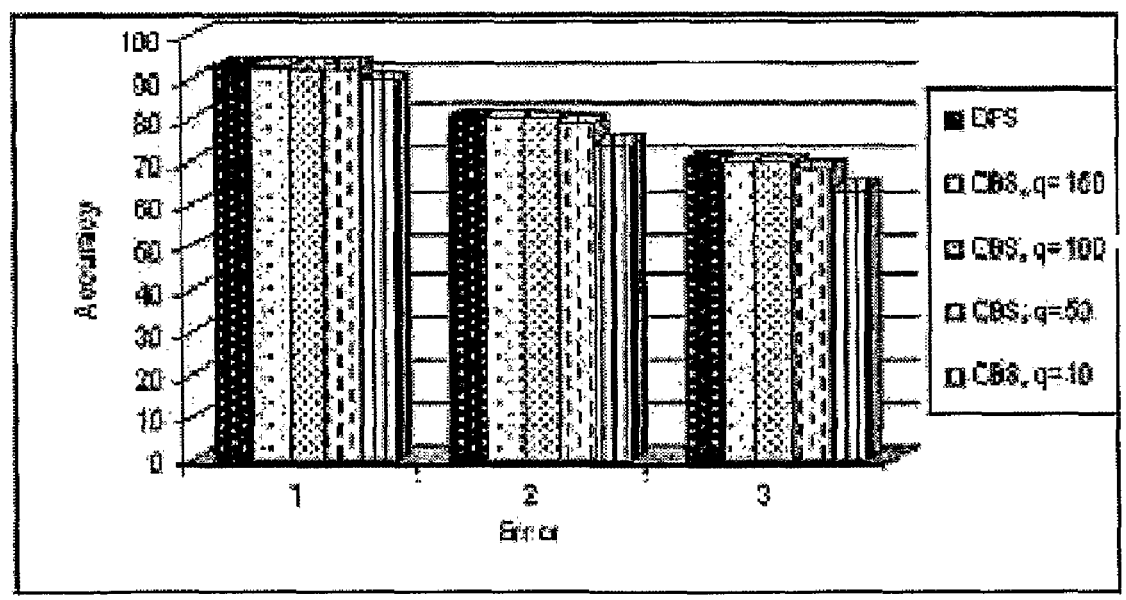
Figure 5:
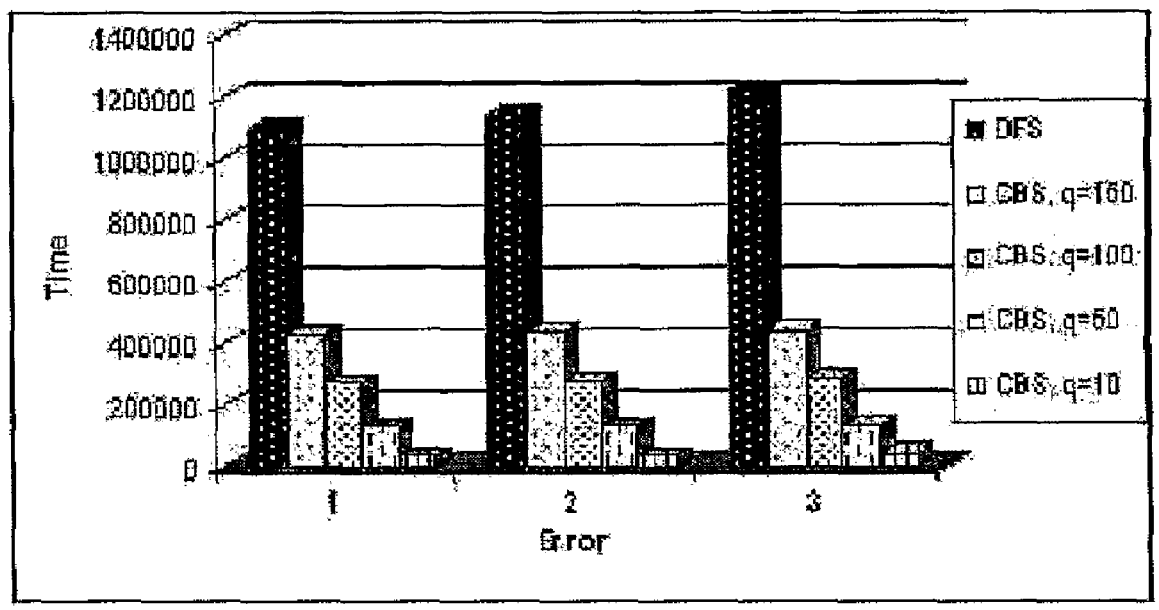
FIG. 5 presents the results for comparing the CBS-LLP-Based method with the DFS-Trie-Based method for the Webster dictionary. The time is represented by the total number of operations in millions.
Figure 5:
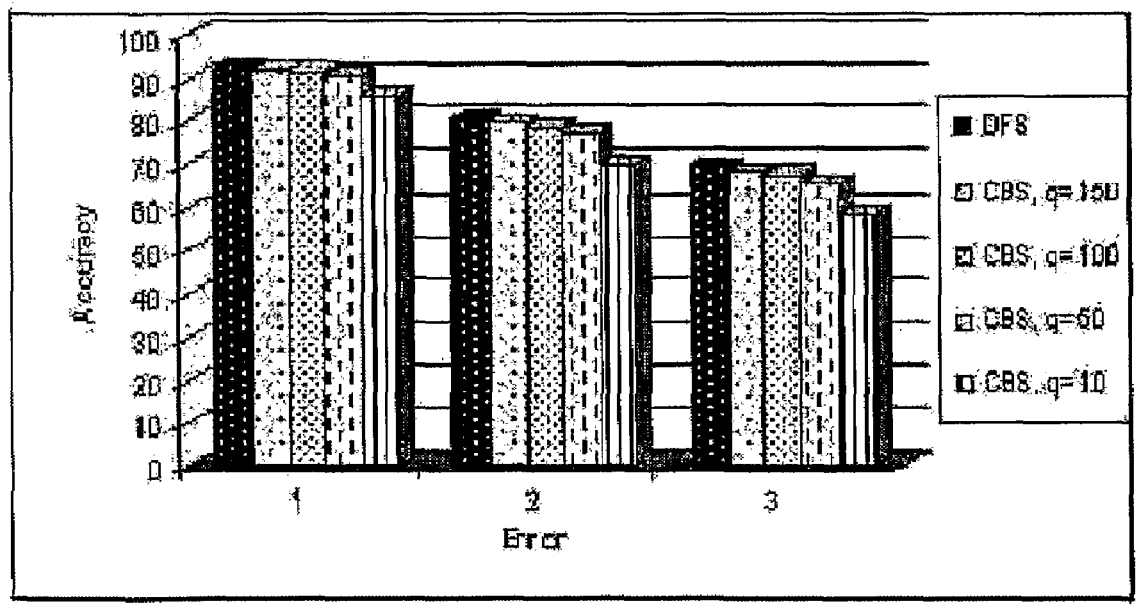

The two algorithms, the DFS-Trie-Based and our algorithm, CBS-LLP-Based, were tested with the three sets of noisy words for each of the three dictionaries. The results obtained in terms of the number of computations (additions and minimizations) and the accuracy for the three sets in Tables 2, 3, and 4 for each of the three dictionaries respectively. The calculations was done on a Pentium V processor, 3.2 GHZ, and the numbers are shown in millions. The results shows the significant benefits of the CBS-Based method with respect to the number of computations, and which at the same time retain an excellent accuracy. FIGS. 3, 4, and 5 show a graphical representation of the results to give an indication of the benefits of the new method. The figures compares both time and accuracy. For example (see Table 4, for the Webster dictionary, for the SA set and when q=100, the number of operations for DFS-Tri-Based is 1,099,279, and for the CBS-LLP-Based method is 271,188, which represents a saving of 75.3%, with a loss of accuracy of only 0.5%. For the Dict dictionary, for the SA set, when q=100, the number of operations for the DFS-Trie-Based is 72,115, and for the CBS-LLP-Based method is 44,254, which represents a saving of 36.6%, with a loss of accuracy of 0.2%. When q=50, the number of operations for the CBS-LLP-Based method is 21,366, which represents a saving of 70.4%, with a loss of accuracy of 0.5% (see Table 3). While there is always a trade-off between time and accuracy, the loss of accuracy here is small when compared to the very significant savings in time.

Figure 6:
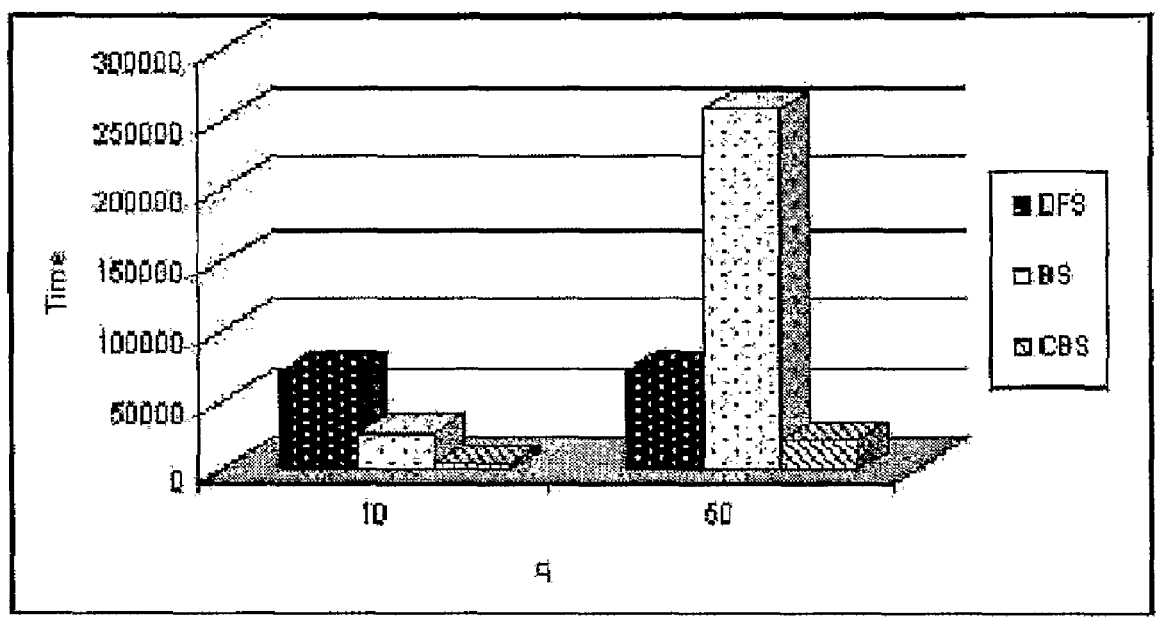
FIG. 6 presents the results for comparing the CBS-LLP-Based method with the BS-LLP-Based method for the Dict dictionary when applied to set SA. The time is represented by the total number of operations in millions.
Figure 6:
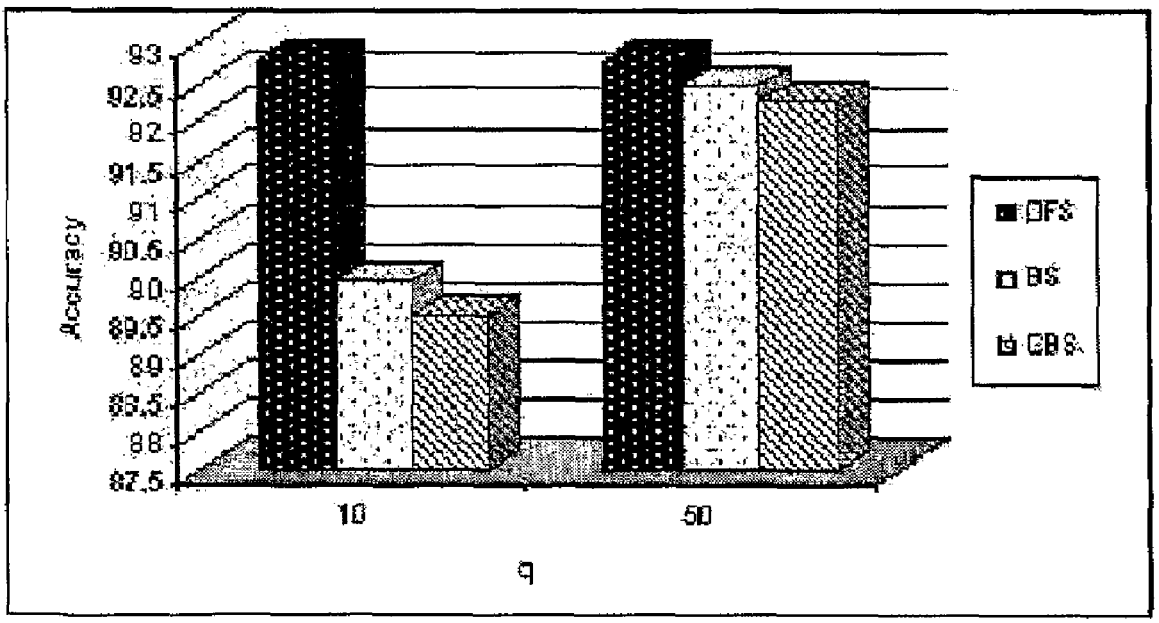

To demonstrate the benefits of the CBS over the BS, the results when applying the BS for the diet dictionary are provided in Table 5 and FIG. 6, when the approximately equivalent width (number of nodes taken per level) is considered for the BS. The width is considered approximately equal when we approximately equate the number of addition operations. The Table shows only the results obtained for the set SA, as these are representative of the results for the other sets too. From the Table one will observe the significant reduction in the operations needed, when the same ordering technique is used for arranging all the priority queues. From Table 3, one can observe that one can increase q in CBS-LLP-Based method to 100, to get an accuracy of 92.6 with savings of 36.6% in the total number of operations with respect to DFS-Trie-Based method. Such an advantage cannot be obtained by merely applying the BS method.

As one can observe from the results above that by marginally sacrificing a small accuracy value for the general error model (by less than 1%), a large computational improvement can be obtained.

Figure 7:
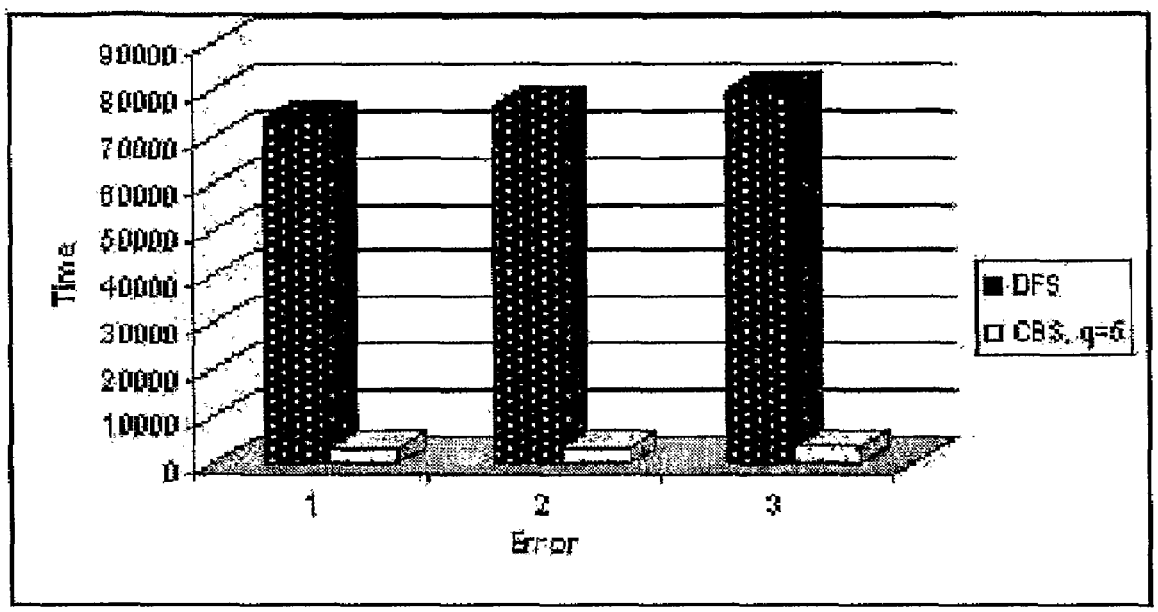
FIG. 7 presents the results for comparing the CBS-LLP-Based method with the DFS-Trie-Based method for the Dict dictionary when the optimized error model is used and q=5. The time is represented by the total number of operations in millions.
Figure 7:
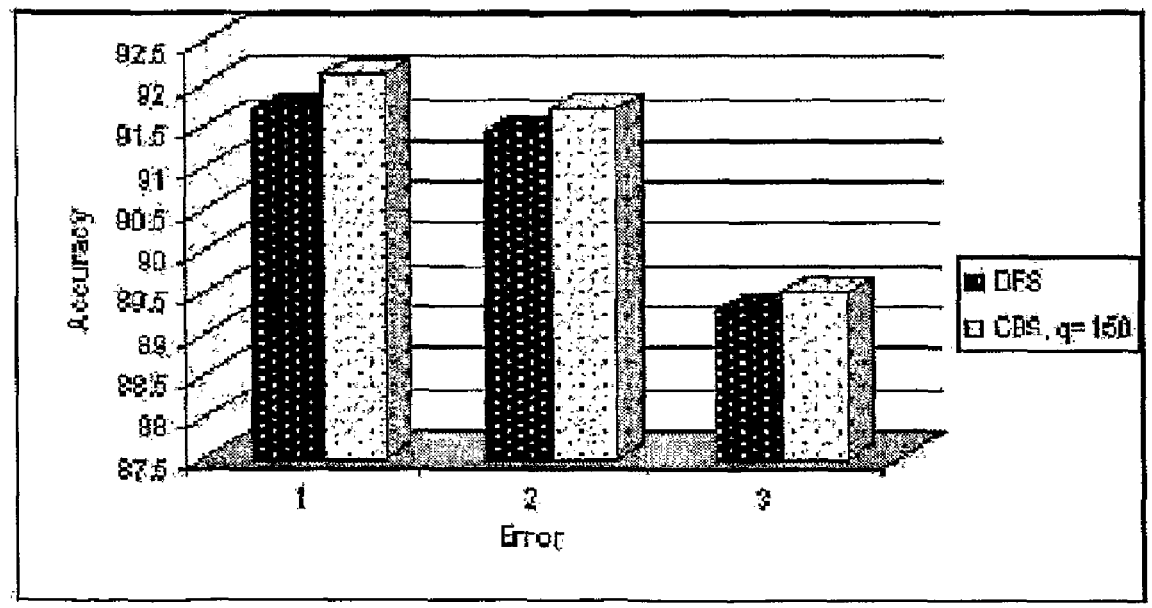

By utilizing the invention in cases where the error model increases the errors as the length of the word increases (i.e., the errors do not appear at the very beginning of the word), an improvement of more than 95% in the number of operations can be obtained. This is because if errors are less likely to appear at the very beginning of the word, the quality of pruning, with respect to accuracy, will be more efficient at the upper levels of the tree. Thus the invention can utilize a small value for q, the width of the beam, and as a result achieve more pruning. All our claims have been verified experimentally as shown in Table 6 and in FIG. 7. The results are shown for q=5, (which is a very small width) demonstrating a very high accuracy. For example, for the set SA, the number of operations for DFS-LLP-Based is 74,167, and for the CBS-Trie-Based method is 3,374, which represents a saving of 95.5%. This has significant benefit if the noisy words received are not noisy at the beginning of the words, in which case one still needs to apply approximate string matching techniques, but even in that case, by utilizing the present invention, one can make use of the "more-approximately" exact part at the very beginning of the string which cannot be used in an exact matching strategy.

TABLE 2

The experimental results obtained from each of the three sets for the Eng dictionary.

| q | Oper | SA DFS | SA CBS | SB DFS | SB CBS | SC DFS | SC CBS |
|---|------|------|------|------|------|------|------|
| 5 | Add | 58.1 | 16.2 | 62.4 | 17.4 | 69.6 | 19.3 |
|   | Min | 39.6 | 14.2 | 42.5 | 14.9 | 47.3 | 16.2 |
|   | Total | 97.7 | 30.4 | 104.9 | 32.3 | 116.9 | 35.5 |
|   | Sav | 68.8 | | 69.2 | | 69.6 | |
|   | Acc | 95.1 | 93.5 | 85.8 | 83.8 | 80.0 | 77.4 |
| 10 | Add | 58.1 | 25.2 | 62.4 | 27.0 | 69.6 | 30.0 |
|   | Min | 39.6 | 24.6 | 42.5 | 25.7 | 47.3 | 27.7 |
|   | Total | 97.7 | 49.8 | 104.9 | 52.7 | 116.9 | 57.7 |
|   | Sav | 49.0 | | 49.7 | | 50.6 | |
|   | Acc | 95.1 | 94.6 | 85.8 | 85.4 | 80.0 | 79.0 |
| 15 | Add | 58.1 | 32.4 | 62.4 | 34.6 | 69.6 | 38.5 |
|   | Min | 39.6 | 34.0 | 42.5 | 35.4 | 47.3 | 37.9 |
|   | Total | 97.7 | 66.4 | 104.9 | 70.0 | 116.9 | 76.4 |
|   | Sav | 32.0 | | 33.2 | | 34.6 | |
|   | Acc | 95.1 | 94.8 | 85.8 | 86.0 | 80.0 | 79.8 |
| 20 | Add | 58.1 | 37.7 | 62.4 | 40.4 | 69.6 | 44.8 |
|   | Min | 39.6 | 41.6 | 42.5 | 43.3 | 47.3 | 46.2 |
|   | Total | 97.7 | 79.3 | 104.9 | 83.7 | 116.9 | 91.0 |
|   | Sav | 18.83 | | 20.2 | | 22.2 | |
|   | Acc | 95.1 | 94.8 | 85.8 | 86.0 | 80.0 | 79.9 |

The results are given in terms of the number of operations needed in millions, and the corresponding accuracy. The results also shows the percentage of savings (in bold) in the total number of operations that the CBS-LLP-Based method obtains over the DFS-Trie-Based method. In the table, "Add" refers to the number of additions, "Min" to the number of minimizations, "Total" refers to the total number of operations, "Sav" refers to the savings obtained by utilizing the present invention, and "Acc" refers to the accuracy obtained by utilizing the present invention.

A preferred embodiment of the invention specifies a method for comparing the similarity of a target string to each of the strings in the Dictionary. The Dictionary is represented as a Trie where the root of the Trie represents the Null string, the internal nodes of the Trie represent the prefixes of the strings in the Dictionary, and where the parent of any node represents a string which is the prefix whose length is less by unity than the length of the string representing the node. The inter-symbol distances associated with the symbols of the Alphabet (A, of cardinality, |A|), are then either obtained or calculated as a function of how one symbol of the Alphabet can be erroneously represented by another. The Trie is then traversed by maintaining |A| priority queues, each containing the lists of nodes yet to be processed. The process then sorts the nodes in the priority queues based on the value of a heuristic measurement evaluated for each of the nodes in the respective priority queues. The nodes which have the least heuristic are then expanded, and replaced by their children in the trie, after which q of them (referred to herein as a "beam") are retained and the rest are deleted from the respective priority lists, and are therefore terminated from all further computation. These evaluation-expansion-deletion steps are then repeated until a node which satisfies a condition of being elements in the dictionary, namely terminal strings, which have the optimal heuristic measurements.

TABLE 3

The experimental results obtained from each of the three sets for the Diet dictionary.

| q | Oper | SA DFS | SA CBS | SB DFS | SB CBS | SC DFS | SC CBS |
|---|------|------|------|------|------|------|------|
| 10 | Add | 42909 | 2619 | 45337 | 2756 | 49319 | 2995 |
|   | Min | 29206 | 2854 | 30825 | 2937 | 33479 | 3092 |
|   | Total | 72115 | 5473 | 76162 | 5693 | 82798 | 6087 |
|   | Sav | 92.4 | | 92.5 | | 92.6 | |
|   | Acc | 92.8 | 89.5 | 80.5 | 74.4 | 70.2 | 63.6 |
| 50 | Add | 42909 | 7195 | 45337 | 7579 | 49319 | 8228 |
|   | Min | 29206 | 14171 | 30825 | 14402 | 33479 | 14823 |
|   | Total | 72115 | 21366 | 76162 | 21981 | 82798 | 23051 |
|   | Sav | 70.4 | | 71.1 | | 72.6 | |
|   | Acc | 92.8 | 92.3 | 80.5 | 79.4 | 70.2 | 68.8 |
| 100 | Add | 42909 | 11447 | 45337 | 12068 | 49319 | 13101 |
|   | Min | 29206 | 32807 | 30825 | 33159 | 33479 | 33786 |
|   | Total | 72115 | 44254 | 76162 | 45227 | 82798 | 46887 |
|   | Sav | 36.6 | | 40.6 | | 43.4 | |
|   | Acc | 92.8 | 92.6 | 80.5 | 80.2 | 70.2 | 69.8 |
| 150 | Add | 42909 | 14526 | 45337 | 15319 | 49319 | 16637 |
|   | Min | 29206 | 51276 | 30825 | 51753 | 33479 | 52591 |
|   | Total | 72115 | 65802 | 76162 | 67072 | 82798 | 69228 |
|   | Sav | 8.8 | | 11.9 | | 16.4 | |
|   | Acc | 92.8 | 92.7 | 80.5 | 80.4 | 70.2 | 70.0 |

The results are given in terms of the number of operations needed in millions, and the corresponding accuracy. The results also shows the percentage of savings (in bold) in the total number of operations that the CBS-LLP-Based method obtains over the DFS-Trie-Based method. In the table, "Add" refers to the number of additions, "Min" to the number of minimizations, "Total" refers to the total number of operations, "Sav" refers to the savings obtained by utilizing the present invention, and "Acc" refers to the accuracy obtained by utilizing the present invention.

In yet another embodiment of the invention, the size of the beam is made variable for each of the priority queues.

In yet another embodiment of the invention, the number of priority queues is set to a value smaller than |A| depending on the branching factor of the Trie.

In yet another embodiment of the invention, we associate a Cluster with every single symbol of the alphabet.

TABLE 4

The experimental results obtained from each of the three sets for the Webster dictionary.

| q | Oper | SA DFS | SA CBS | SB DFS | SB CBS | SC DFS | SC CBS |
|---|---|---|---|---|---|---|---|
| 10 | Add | 654692 | 16090 | 681001 | 16605 | 726513 | 17739 |
|  | Min | 444587 | 17153 | 462126 | 17444 | 492467 | 18215 |
|  | Total | 1099279 | 33243 | 1143127 | 34049 | 1218980 | 35954 |
|  | Sav |  | 96.9 |  | 97.0 |  | 97.1 |
|  | Acc | 92.5 | 86.2 | 80.3 | 69.7 | 69.5 | 58.3 |
| 50 | Add | 654692 | 43395 | 681001 | 44890 | 726513 | 47703 |
|  | Min | 444587 | 83549 | 462126 | 84212 | 492467 | 85772 |
|  | Total | 1099279 | 126944 | 1143127 | 129102 | 1218980 | 133475 |
|  | Sav |  | 88.5 |  | 88.7 |  | 89.1 |
|  | Acc | 92.5 | 90.8 | 80.3 | 77.1 | 69.5 | 65.5 |
| 100 | Add | 654692 | 70603 | 681001 | 73183 | 726513 | 77876 |
|  | Min | 444587 | 200585 | 462126 | 201764 | 492467 | 204401 |
|  | Total | 1099279 | 271188 | 1143127 | 274947 | 1218980 | 28227 |
|  | Sav |  | 75.3 |  | 75.9 |  | 76.8 |
|  | Acc | 92.5 | 91.9 | 80.3 | 78.9 | 69.5 | 67.57 |
| 150 | Add | 654692 | 92673 | 681001 | 96111 | 726513 | 102289 |
|  | Min | 444587 | 337323 | 462126 | 338184 | 492467 | 342062 |
|  | Total | 1099279 | 429996 | 1143127 | 434295 | 1218980 | 444351 |
|  | Sav |  | 60.88 |  | 62.0 |  | 63.5 |
|  | Acc | 92.5 | 92.2 | 80.3 | 79.6 | 69.5 | 68.4 |

The results are given in terms of the number of operations needed in millions, and the corresponding accuracy. The results also shows the percentage of savings (in bold) in the total number of operations that the CBS-LLP-Based method obtains over the DFS-Trie-Based method. In the table, "Add" refers to the number of additions, "Min" to the number of minimizations, "Total" refers to the total number of operations, "Sav" refers to the savings obtained by utilizing the present invention, and "Acc" refers to the accuracy obtained by utilizing the present invention.

TABLE 5

The experimental results obtained from each of the three sets for the Dict dictionary.

| | q = 10 | | q = 50 | |
|---|---|---|---|---|
| Oper | BS | CBS | BS | CBS |
| Add | 2840 | 2619 | 7914 | 7195 |
| Min | 25310 | 2854 | 249056 | 14171 |
| Total | 28150 | 5473 | 256970 | 21366 |
| Sav |  | 80.6 |  | 91.7 |
| Acc | 89.9 | 89.5 | 92.5 | 92.3 |

The results are given in terms of the number of operations needed in millions, and the corresponding accuracy. The results also shows the percentage of savings (in bold) in the total number of operations that the CBS-LLP-Based method obtains over the BS-LLP-Based method when applied to set SA. In the table, "Add" refers to the number of additions, "Min" to the number of minimizations, "Total" refers to the total number of operations, "Sav" refers to the savings obtained by utilizing the present invention, and "Acc" refers to the accuracy obtained by utilizing the present invention.

TABLE 6

The experimental results obtained from each of the three sets for the dict dictionary.

| | SA | | SB | | SC | |
|---|---|---|---|---|---|---|
| Oper | DFS | CBS | DFS | CBS | DFS | CBS |
| Add | 44140 | 1756 | 45629 | 1832 | 47711 | 1913 |
| Min | 30027 | 1618 | 31219 | 1672 | 32407 | 1730 |
| Total | 74167 | 3374 | 77148 | 3504 | 80118 | 3643 |

TABLE 6-continued

The experimental results obtained from each of the three sets for the dict dictionary.

| | SA | | SB | | SC | |
|---|---|---|---|---|---|---|
| Oper | DFS | CBS | DFS | CBS | DFS | CBS |
| Sav |  | 95.5 |  | 95.5 |  | 95.5 |
| Acc | 91.7 | 92.1 | 91.4 | 91.7 | 89.3 | 89.5 |

The results are given in terms of the number of operations needed in millions, and the corresponding accuracy. The results also shows the percentage of savings (in bold) in the total number of operations that the CBS-LLP-Based method obtains over the DFS-Trie-Based method when the optimized error model is used and q = 5. In the table, "Add" refers to the number of additions, "Min" to the number of minimizations, "Total" refers to the total number of operations, "Sav" refers to the savings obtained by utilizing the present invention, and "Acc" refers to the accuracy obtained by utilizing the present invention.

In another embodiment of the invention, a Cluster may have more than one symbol of the Alphabet associated with it.

In yet another embodiment of the invention, a symbol of the Alphabet may have no Cluster associated with it.

In yet another embodiment of the invention, the heuristic function used is the Generalized Levenshtein Distance (GLD) between the string represented by the node and the corresponding prefix of the target string.

In yet another embodiment of the invention, the heuristic function used is a pseudo-distance (where the latter distance is the approximation of the GLD, and is the Generalized Levenshtein Distance between the prefix of the said target string and the string associated with an ancestor of the said node being placed in the said data structure, and where the said Generalized Levenshtein Distance between any two strings is defined as the cost associated with the process of editing the first string into the second, and is the minimum of the sum of the individual edit distances associated with the edit operations of substituting a symbol of the first string into a symbol of the second string, deleting a symbol of the first string, inserting a symbol of the second string, and transposing adjacent symbols of the first string to yield the symbols of the second string).

In yet another embodiment of the invention, some of the members of the alphabet set may themselves be sequences obtained from a more primitive set of symbols. Thus, the symbols of the alphabet may be the words "how", "are", "you", which are themselves sequences created from more primitive symbols, namely the English alphabet.

The application domains where the invention can be utilized are numerous and include:

1. The Internet: When searching the Internet, it is often the case that the user enters the word to be searched incorrectly. The present invention can be used to achieve a proximity search of the Internet and locate sites and documents that contain words which closely match the one entered. The present invention can thus be used to greatly enhance the power of search engines.
2. Keyword Search: When searching libraries and collections, it can occur that the user enters the keyword with spelling or phonetic errors. The present invention can be used to search the library or respective collection by first determining the keywords which best match the entered string, and then executing the search.
3. Spelling Correction: The present invention can be used to achieve the automatic correction of misspelled strings or substrings in a document.
4. Speech Recognition: If the waveform associated with a speech signal is processed to yield a string of phonemes, the present invention can be used to process the phoneme sequence to recognize the speech utterance or speaker.
5. Optical Character Recognition: If the digital pixels associated with a sequence of handwritten or printed characters are processed to yield a string of syntactic primitives, the present invention can be used to process the primitives sequence to recognize the words represented by the handwriting or sequence of printed characters.
6. Processing of Biological Sequences: The present invention can be used to locate subsequences in sequences when the former are inaccurately represented. Thus, the invention has potential applications in the human or other genomic projects, in the detection of targets for diseases, and ultimately in the drug-design process.
7. Applications in Communication Theory: The present invention can be used for designing and recognizing fast convolutional codes if their noisy versions are processed. It can thus be also used in communication channels for detecting symbols by finding the "most-likely" noiseless sequence.

The present invention has been described herein with regard to preferred embodiments. However, it will be obvious to persons skilled in the art that a number of variations and modifications can be made without departing from the scope of the invention as described herein.

REFERENCES

[1] A. Acharya, H. Zhu, and K. Shen. Adaptive algorithms for cache-efficient trie search. *ACM and SIAM Workshop on Algorithm Engineering and Experimentation*, January 1999.

[2] R. Baeza-Yates and G. Navarro. Fast approximate string matching in a dictionary. *in Proceedings of the 5th South American Symposium on String Processing and Information Retrieval (SPIRE'98), IEEE CS Press*, pages 14-22, 1998.

[3] J. Bentley and R. Sedgewick. Fast algorithms for sorting and searching strings. *Eighth Annual ACM-SIAM Symposium on Discrete Algorithms New Orleans*, January 1997.

[4] H. Bunke. Fast approximate matching of words against a dictionary. *Computing*, 55(1):75-89, 1995.

[5] J. Clement, P. Flajolet, and B. Vallee. The analysis of hybrid trie structures. *Proc. Annual A CM-SIAM Symp. on Discrete Algorithms*, San Francisco, Calif., pages 531-539, 1998.

[6] G. Dewey. *Relative Frequency of English Speech Sounds*. Harvard Univ. Press, 1923.

[7] M. Du and S. Chang. An approach to designing very fast approximate string matching algorithms. *IEEE Transactions on Knowledge and Data Engineering*, 6(4):620-633, 1994.

[8] G. D. Forney. The viterbi algorithm. *Proceedings of the IEEE*, 61(3):268-278, March 1973.

[9] R. L. Kashyap and B. J. Oommen. An effective algorithm for string correction using generalized edit distances -i. description of the algorithm and its optimality. *Inf. Sci.*, 23(2):123-142, 1981.

[10] G. F. Luger and W. A. Stubblefield. *Artificial Intelligence Structure and Strategies for Complex Problem Solving*. Addison-Wesley, 1998.

[11] K. Oflazer. Error-tolerant finite state recognition with applications to morphological analysis and spelling correction. *Computational Linguistics*, 22(1):73-89, March 1996.

[12] B. J. Oommen and G. Badr. Dictionary-based syntactic pattern recognition using tries. *Procedings of the Joint IARR International Workshops SSPR 2004 and SPR 2004*, pages 251-259, August 2004.

[13] B. J. Oommen and R. L. Kashyap. A formal theory for optimal and information theoretic syntactic pattern recognition. 31:1159-1177, 1998.

[14] J. Pearl. *Heuristics: intelligent search strategies for computer problem solving*. Addison-Wesley, 1984.

[15] J. L. Peterson. Computer programs for detecting and correcting spelling errors. *Comm. Assoc. Comput. Mach.*, 23:676-687, 1980.

[16] K. M. Risvik. Search system and method for retrieval of data, and the use thereof in a search engine. *United States Patent*, April 2002.

[17] S. Russell and P. Norvig. *Artificial Intelligence: A Modern Approach*. Prentice Hall, 2003.

[18] H. Shang and T. Merrettal. Tries for approximate string matching. *IEEE Transactions on Knowledge and Data Engineering*, 8(4):540-547, August 1996.

[20] E. Ukkonen. Algorithm for approximate string matching. *Information and control*, 64:100-118, 1985.

[21] R. Wagner and A. Fischer. The string-to-string correction problem. *Journal of the Association for Computing Machinery (ACM)*, 21:168-173, 1974.

The embodiments of the invention in which an exclusive property or privilege is claimed are defined as follows:

1. A method executed in a computer system for comparing the similarity of a target string to at least one string in a set of strings, the target string and each string in the set of strings being a sequence of symbols from an alphabet of symbols, the method comprising the steps of:

(a) Generating a multi-level Trie associated with the set of strings, the Trie having a null level and a null node thereon, and a plurality of data levels having a plurality of data nodes thereon, each data node having a symbol of the alphabet associated therewith;

(b) From the null node, traversing a plurality of levels of the Trie commencing with the first data level adjacent the null node, and thereafter descending level by level within the Trie;

(c) For each data level of the Trie traversed, making a first selection of a set of data nodes from that level, which first selection step includes the steps of:
  i. In the case of the first data level of the Trie, selecting all of the data nodes in that level of the Trie; and
  ii. In the case of at least one other data levels of the Trie, for each such level
    A. Making a second selection of all of the children of the nodes of the first selection of the level immediately previously traversed;
    B. For each of the data nodes selected in step A, calculating a heuristic measurement between the sequence of symbols in the target string and the sequence formed by the symbols on the path from the null node to that selected data node; and
    C. For at least a first symbol represented, selecting a first cluster of nodes representing that first symbol that have the most optimal calculated heuristic measurement associated therewith, up to a bounded number of nodes and identifying the terminal nodes in the first cluster of nodes;

(d) Continuing to traverse the Trie, level by level, repeating step (c) in respect of each level traversed, until step (c) has been completed on that level of the Trie for which there are no children of the selected nodes; and (e) In respect of each terminal node identified during the traversal of the plurality of levels of the Trie, comparing the calculated heuristic measurement associated therewith and reporting at least one string from the set of strings associated with the optimal calculated heuristic measurement.

2. A method executed in a computer system for comparing the similarity of a target string to at least one string in a set of strings, the target string and each string in the set of strings being a sequence of symbols from an alphabet of symbols, and the set of strings being represented in a Trie, the Trie having a null level and a null node thereon, and a plurality of data levels having a plurality of data nodes thereon, each data node having a symbol of the alphabet associated therewith, the method comprising the steps of:

(a) From the null node, traversing a plurality of levels of the Trie commencing with the first data level adjacent the null node, and thereafter descending level by level within the Trie;

(b) For each data level of the Trie traversed, making a first selection of a set of data nodes from that level, which first selection step includes the steps of:
  i. In the case of the first data level of the Trie, selecting all of the data nodes in that level of the Trie; and
  ii. In the case of at least one other data levels of the Trie, for each such level
    A. Making a second selection of all of the children of the nodes of the first selection of the level immediately previously traversed;
    B. For each of the data nodes selected in step A, calculating a heuristic measurement between the sequence of symbols in the target string and the sequence formed by the symbols on the path from the null node to that selected data node; and
    C. For at least a first symbol represented, selecting a first cluster of nodes representing that first symbol that have the most optimal calculated heuristic measurement associated therewith, up to a bounded number of nodes and identifying the terminal nodes in the first cluster of nodes;

(c) Continuing to traverse the Trie, level by level, repeating step (b) in respect of each level traversed, until step (b) has been completed on that level of the Trie for which there are no children of the selected nodes; and (d) In respect of each terminal node identified during the traversal of the plurality of levels of the Trie, comparing the calculated heuristic measurement associated therewith and reporting at least one string from the set of strings associated with the optimal calculated heuristic measurement.

3. A method according to claim 1 wherein the heuristic function is a distance measurement between the sequence of symbols in the target string and the sequence formed by the symbols on the path from the null node to that selected data node.

4. A method according to claim 1 wherein the Trie is represented as a Linked List of Prefixes comprising a set of linked lists of nodes, each linked list of nodes corresponding to and representing all of the nodes on a level of the Trie.

5. A method according to claim 4 wherein the linked lists in the set of linked lists are ordered in accordance with the level of the nodes represented by that linked list.

6. A method according to claim 1 wherein representations of the nodes in each cluster are maintained in a priority queue in which the position of the representations of the nodes in the priority queue is determined by the value of the heuristic measurement associated with the said nodes.

7. A method according to claim 1 wherein at least one priority queue is maintained in a matrix.

8. A method according to claim 1 wherein for at least a second symbol, selecting a second cluster of nodes presenting that second symbol that has the most optimal calculated heuristic measurement associated therein, up to a bounded number of nodes, the bound for that number being different from the bound for the number for the first cluster.

9. A method according to claim 1 wherein the heuristic measurement is the Generalized Levenshtein Distance.

10. A method according to claim 1 wherein the heuristic measurement is a pseudo-distance which approximates the Generalized Levenshtein Distance.

11. A method according to claim 1 wherein the number of priority queues maintained depends on the branching factor of the Trie.

12. A method according to claim 1 wherein at least one cluster has more than one symbol of the alphabet associated with it.

13. A method according to claim 1 wherein in at least one cluster the decision of whether a node is retained for subsequent processing is made by performing a comparison involving the magnitude of the heuristic measurement between the target string and the string represented by that node.

14. A method according to claim 1 wherein at least one symbol of the alphabet is a sequence of primitive symbols.

* * * * *

UNITED STATES PATENT AND TRADEMARK OFFICE
CERTIFICATE OF CORRECTION

PATENT NO. : 7,689,588 B2  
APPLICATION NO. : 11/916605  
DATED : March 30, 2010  
INVENTOR(S) : Badr et al.

Page 1 of 1

It is certified that error appears in the above-identified patent and that said Letters Patent is hereby corrected as shown below:

In the Abstract, Line 12, "D(X5Y)" should be replaced with --D(X,Y)--.

Signed and Sealed this  
Thirty-first Day of May, 2011

David J. Kappos  
*Director of the United States Patent and Trademark Office*